US010894484B2

(12) United States Patent
Han et al.

(10) Patent No.: US 10,894,484 B2
(45) Date of Patent: Jan. 19, 2021

(54) ELECTRIC AUTOMOBILE ENERGY MONITORING AND SWAPPING NETWORK IN REMOTE MONITORING OF CLOUD COMPUTING NETWORK

(71) Applicant: Lei Han, Beijing (CN)

(72) Inventors: Lei Han, Beijing (CN); Wanhui Han, Beijing (CN)

(73) Assignee: Lei Han, Beijing (CN)

( * ) Notice: Subject to any disclaimer, the term of this patent is extended or adjusted under 35 U.S.C. 154(b) by 54 days.

(21) Appl. No.: 16/093,637

(22) PCT Filed: Mar. 21, 2017

(86) PCT No.: PCT/CN2017/077438
§ 371 (c)(1),
(2) Date: Dec. 7, 2018

(87) PCT Pub. No.: WO2017/185914
PCT Pub. Date: Nov. 2, 2017

(65) Prior Publication Data
US 2019/0126775 A1    May 2, 2019

(30) Foreign Application Priority Data

Apr. 25, 2016    (CN) .......................... 2016 1 0297615

(51) Int. Cl.
*B60L 53/80* (2019.01)
*B60L 53/66* (2019.01)
(Continued)

(52) U.S. Cl.
CPC .............. *B60L 53/80* (2019.02); *B60L 53/66* (2019.02); *B60L 58/12* (2019.02); *G07C 5/008* (2013.01)

(58) Field of Classification Search
CPC .......... B60L 53/80; B60L 53/66; B60L 58/12; B60L 58/13; B60L 3/0046; B60L 2240/545; B60L 2240/547; B60L 2240/549; B60L 3/12; B60L 2240/622; B60L 53/65; B60L 53/305; B60L 2240/70; B60L 53/67;
(Continued)

(56) References Cited

U.S. PATENT DOCUMENTS

2015/0077054 A1*    3/2015 Uyeki .................... B60L 55/00
                                                    320/109
2016/0178678 A1*    6/2016 Pelletier .................. H02J 3/32
                                                    705/39

FOREIGN PATENT DOCUMENTS

WO    WO-2013/011692    *    1/2013

* cited by examiner

*Primary Examiner* — Muhammad Shafi

(57) ABSTRACT

A remote energy monitoring and swapping network for electric vehicle based on cloud computing network, which uses cloud computing technology, Internet of Things technology, video identification technology and remote monitoring system with remote monitoring center based on multi-type monitoring system to control electric vehicle, remote battery monitoring system and battery swapping system. The remote monitoring center and battery swapping system replace the first battery pack and the second battery pack on the electric vehicle chassis in nine steps. Battery swapping station solves the problem of battery energy supply by station nets, which lays a theoretical and technical foundation for the popularization of electric vehicles. The remote monitoring center's control of the whole battery swapping process improves the work efficiency, saves labor cost and reduce battery cost.

5 Claims, 13 Drawing Sheets

Figure 1:
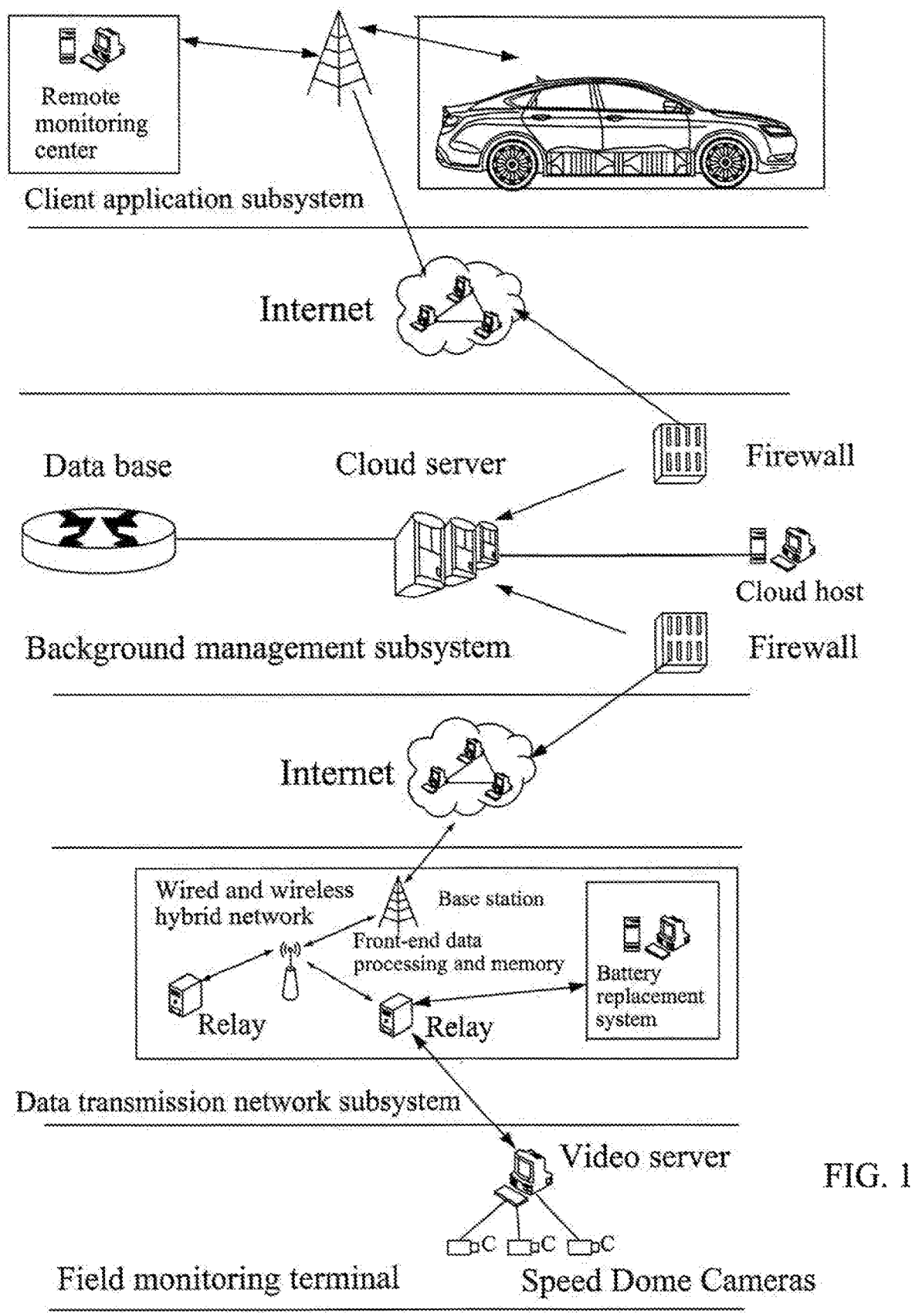

(51) Int. Cl.
*B60L 58/12* (2019.01)
*G07C 5/00* (2006.01)

(58) Field of Classification Search
CPC . B60L 53/68; G07C 5/008; B60S 5/06; G05B 23/0213
USPC .......................................................... 701/22
See application file for complete search history.

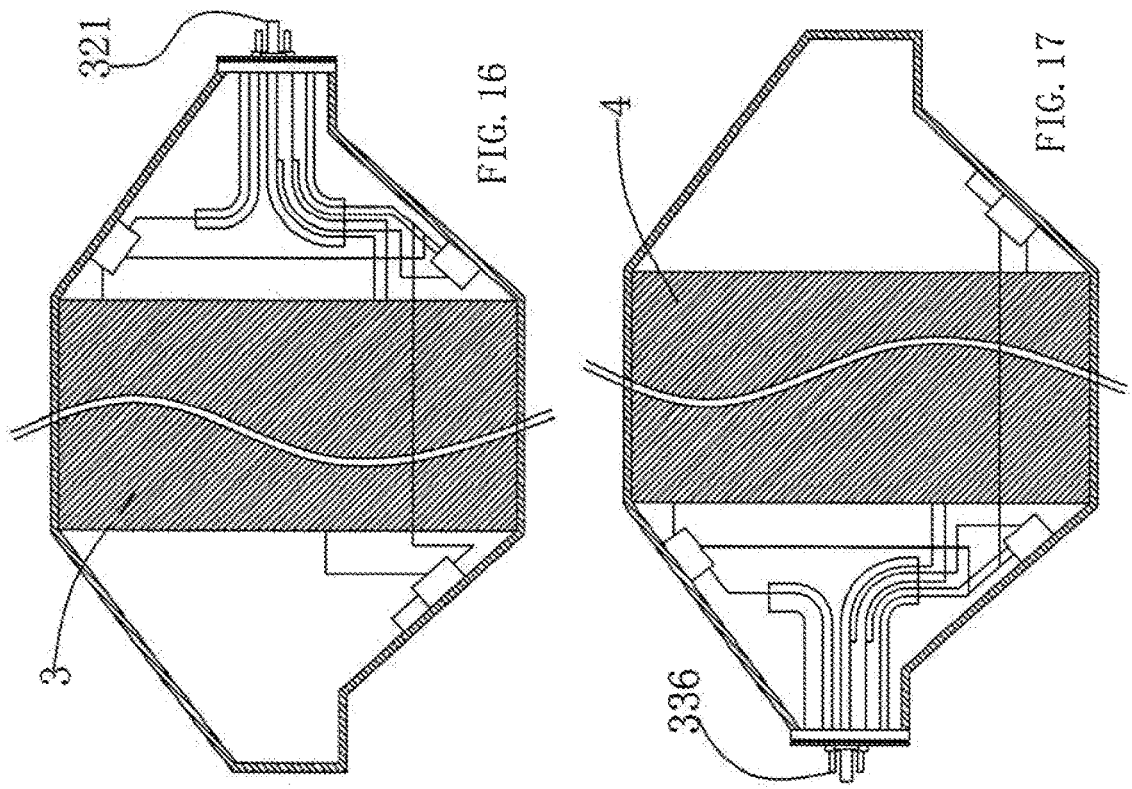
FIG. 16
FIG. 17
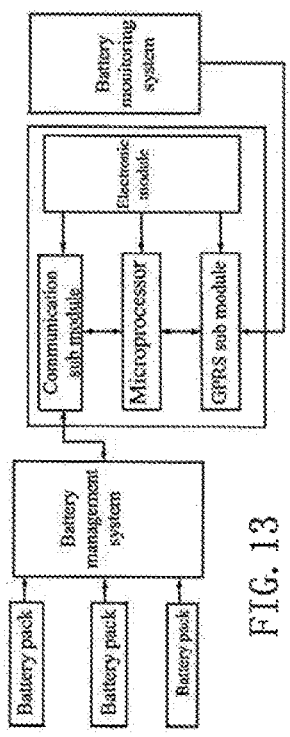
FIG. 13
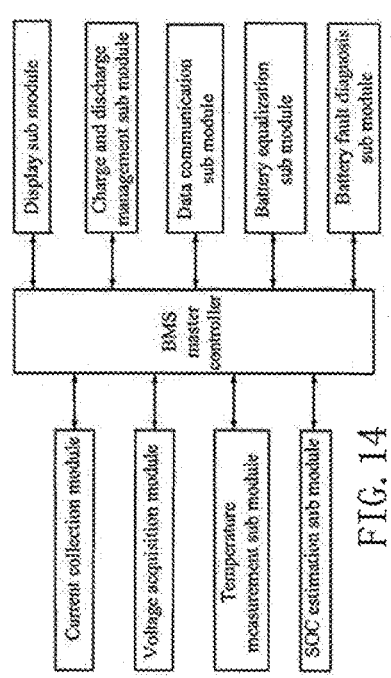
FIG. 14
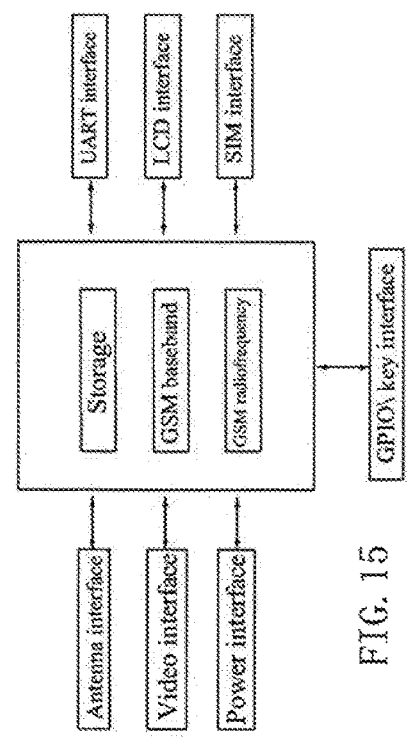
FIG. 15

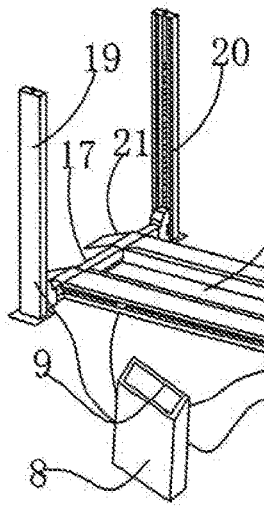
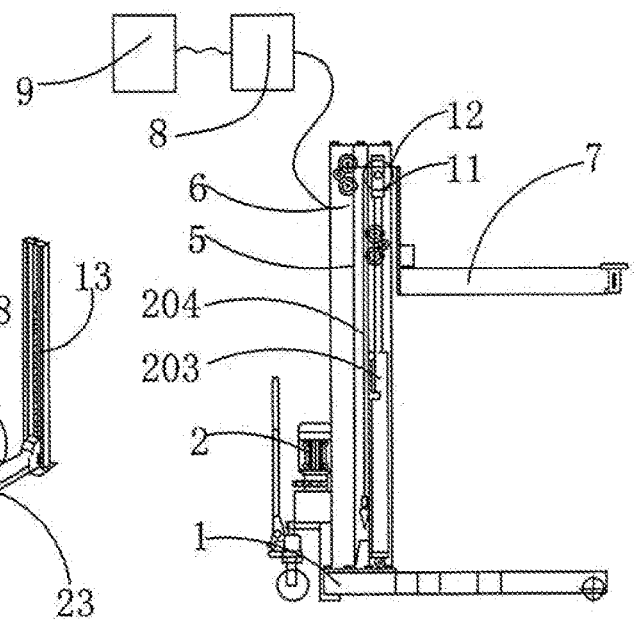
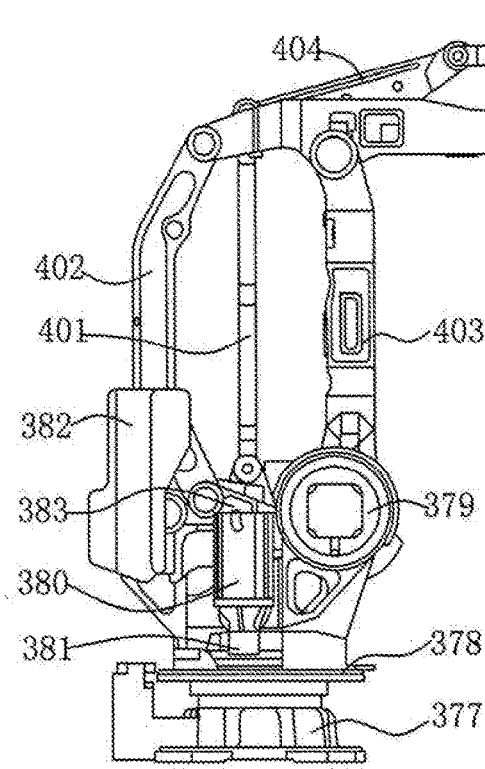
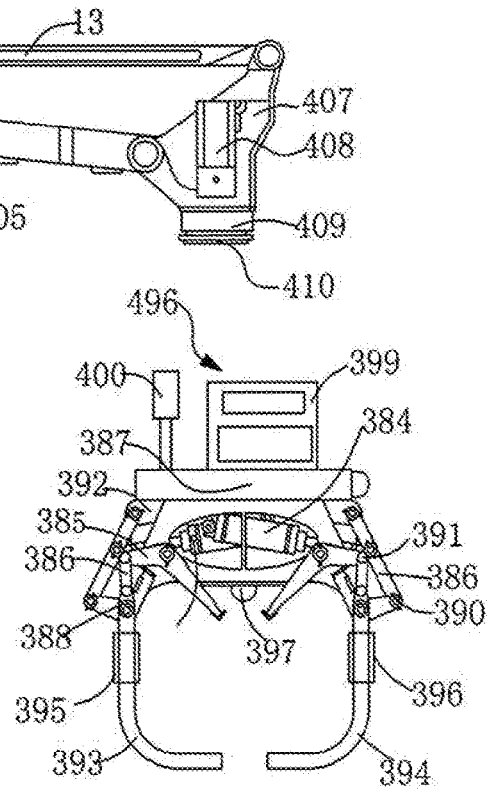
FIG. 26
FIG. 27
FIG. 28
FIG. 29

ELECTRIC AUTOMOBILE ENERGY MONITORING AND SWAPPING NETWORK IN REMOTE MONITORING OF CLOUD COMPUTING NETWORK

TECHNOLOGY FIELD

The invention relates to electric vehicle's energy remote monitoring and swapping network based on cloud computing network, which includes big data, cloud computing technology, Internet of Things technology, video identification technology and multi-type monitoring system inside remote monitoring center, electric vehicle monitoring network, electric vehicle battery monitoring network and battery swapping system on an electric vehicle chassis.

BACKGROUND TECHNOLOGY

With the deepening of the global energy crisis, as well as serious environment pollution, major automotive enterprises around the world generally recognize that energy saving and emission reduction is the main direction of future automotive technology development. Among them, electric vehicles, as a new generation of vehicles, is energy-saving with incomparable advantages, reducing the dependence on traditional fossil resources and getting more and more car research favor. Especially in the safe operation and supervision of electric vehicles, electric vehicles has attracted wide attention. Therefore, it is an important for electric vehicle's safe operation to monitor and manage the battery swapping station remotely. After the large-scale popularization of electric vehicles, 70%-80% of electric vehicles will use battery swapping to supple energy.

This invention overcomes disadvantages by drawing on the experiences of the following patents or patent applications:

1. CN201510330809.5 Digital intelligent grain depot comprehensive management system;
2. CN201410053423.X Battery pack swapping system using multiple robots and Internet;
3. CN201510478027.6 Battery pack swapping and anti-riot system on electric vehicle chassis controlled by Internet of things;
4. CN201510520012.1 A remote monitoring system for battery swapping system of electric vehicles;
5. CN201310549529.4 Airport operation command simulation training system and its simulation training method;
6. CN201510503916.3 A remote monitoring method for electric vehicles.

Invention Content

This invention provides a remote control center, an electric vehicle remote monitoring system, a battery remote monitoring system, a battery swapping system on the chassis of an electric vehicle and an internal main display, which integrates big data and cloud computer technology, the Internet of Things technology, video identification technology, a battery monitoring network system based on multi-type monitoring and electric vehicle energy swapping network.

Based on cloud technology and adopting active security early warning mode, a set of integrated digital intelligent management system is put forward through data acquisition and aggregation protocol, mobile Internet access, Internet communication, database management, image recognition and video analysis, and other key technologies, which reserves function extension interfaces, improves service ability, and effectively solve the common problems in existing digital management information system.

The operation monitoring center includes large-screen LCD display, large-screen display control host, network switch, graphics splicing controller, graphics workstation, graphics workstation group control host, wireless handlebar, server group and terminal group; the network switch is connected to the graphics workstation, graphics splicing controller, laboratory operator's operating position, graphics workstation group control host, servers and terminals respectively. And the operation monitoring center promotes the standardization and standardization process of operation command of battery swapping stations.

The remote monitoring system for battery management system of electric vehicle includes multiple battery packs, battery management system, data remote transmission terminal module and remote monitoring center. The battery management system is connected with multiple battery packs to obtain the running state parameters of the battery packs in real time. The battery management system realizes two-way communication to remote data transmission terminal module through CAN bus, including communication sub-module, GPRS sub-module, power supply sub-module and microprocessor. And the remote monitoring center communicates with the data remote transmission terminal module through GPRS. Workers in the remote monitoring center can obtain real-time operating parameters of the battery and battery pack in different operating conditions.

Remote Monitoring Center and Battery Swapping System is consisted of Remote Monitoring Center, Monitoring Computer, First Palletizing Robot, Second Palletizing Robot, Ferry Robot, Four-Pillar Lift, First Conveyor Line and Second Conveyor Line, which are connected through a variety of computer monitoring software, wired Internet or wireless Internet, 3G/4G wireless network by on-board device of the electric vehicle. Battery Swapping System is composed of the first monitoring station, the second monitoring station and the third monitoring station, which uses the computer of the monitoring center to control and direct the batteries swapping. With the Battery Swapping System, the first battery pack and the second battery pack with stored energy are replaced in nine steps.

The invention has beneficial effect that the electric vehicle remote monitoring system, the electric vehicle battery remote monitoring system and the battery swapping system are controlled by the remote monitoring center based on cloud computing technology and Internet of Things technology. The battery swapping station controlled by the remote monitoring center improves the efficiency of the whole battery swapping process of the electric vehicle and reduces battery cost. Also, the battery swapping station solves the problem of battery energy replacement by mesh layout, which lays a theoretical and technical foundation for the popularization of electric vehicles.

FIGURE ILLUSTRATION

Figure 2:
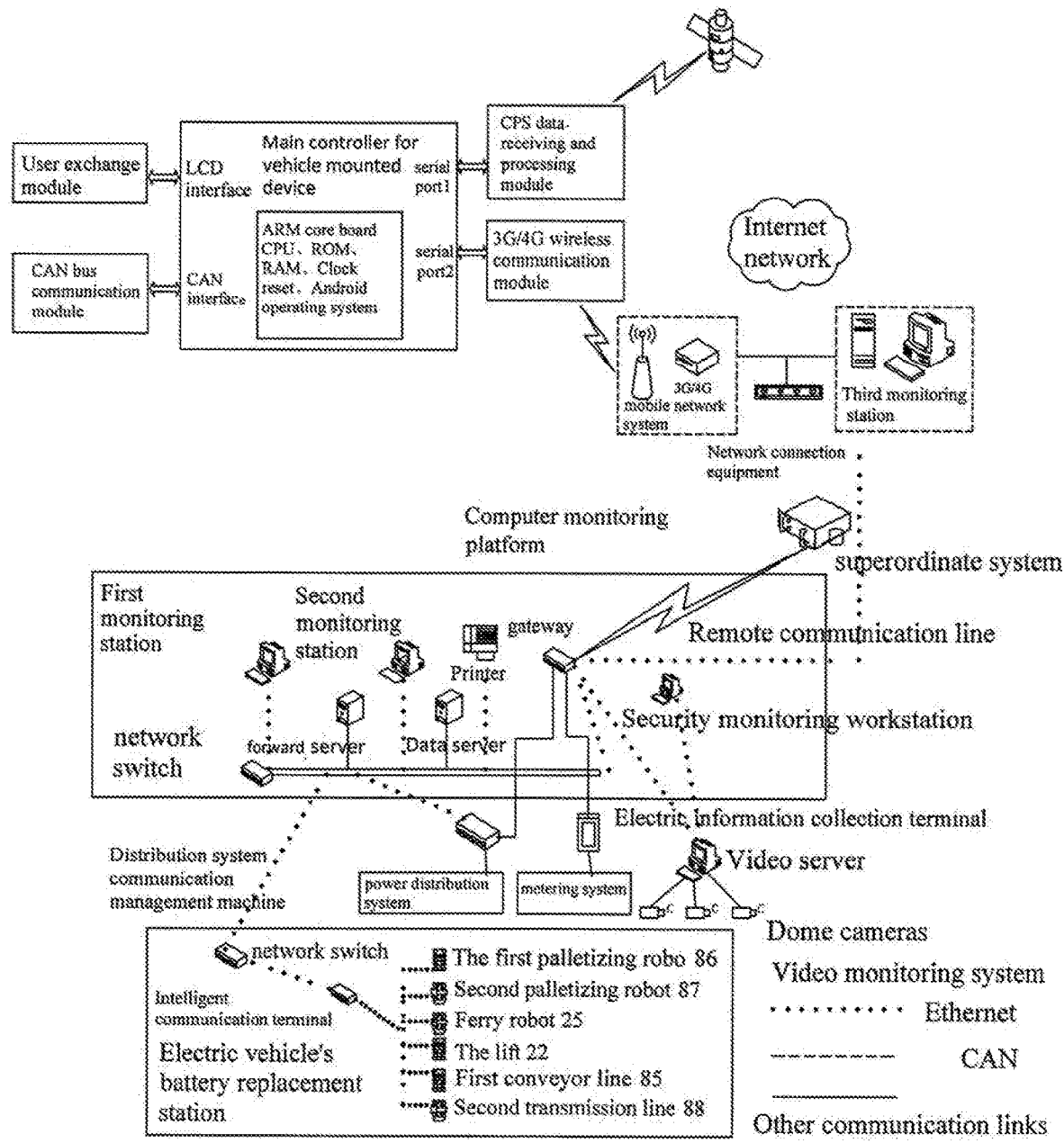
Figure 3:
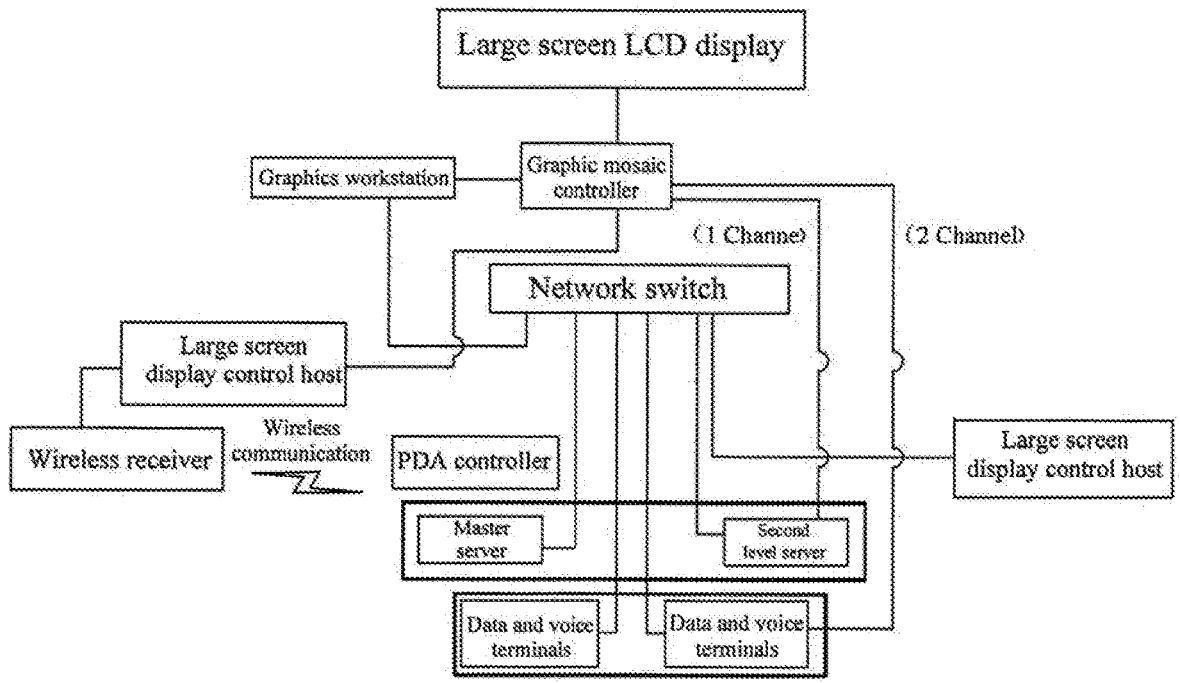
Figure 4:
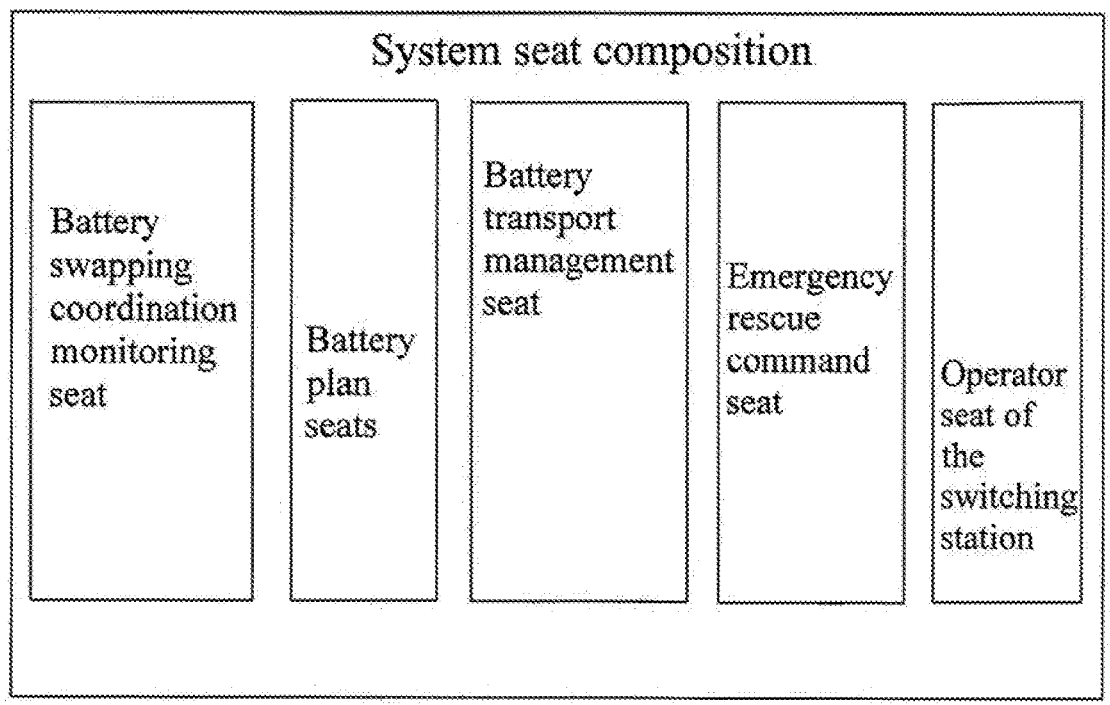
Figure 5:
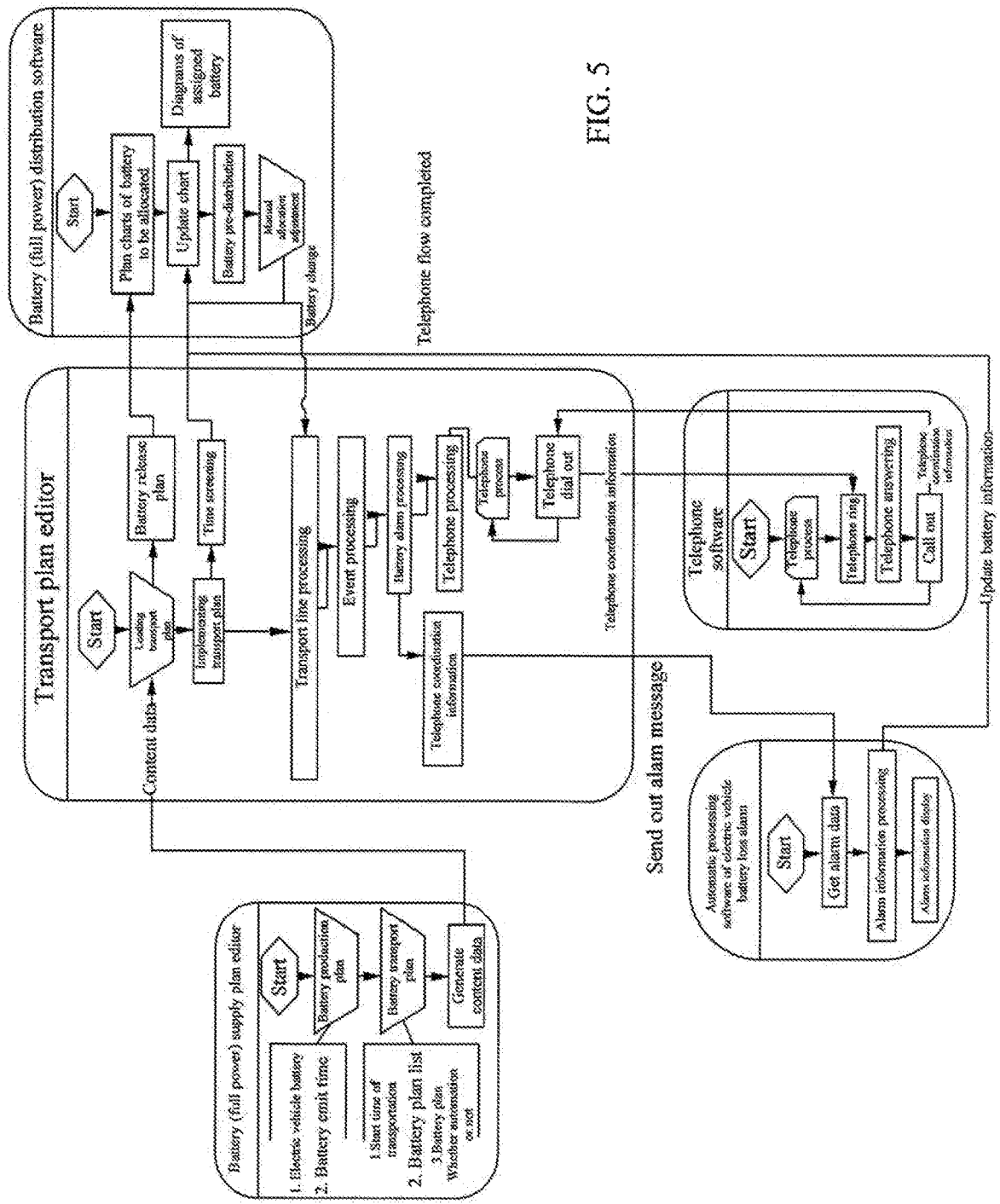
Figure 6:
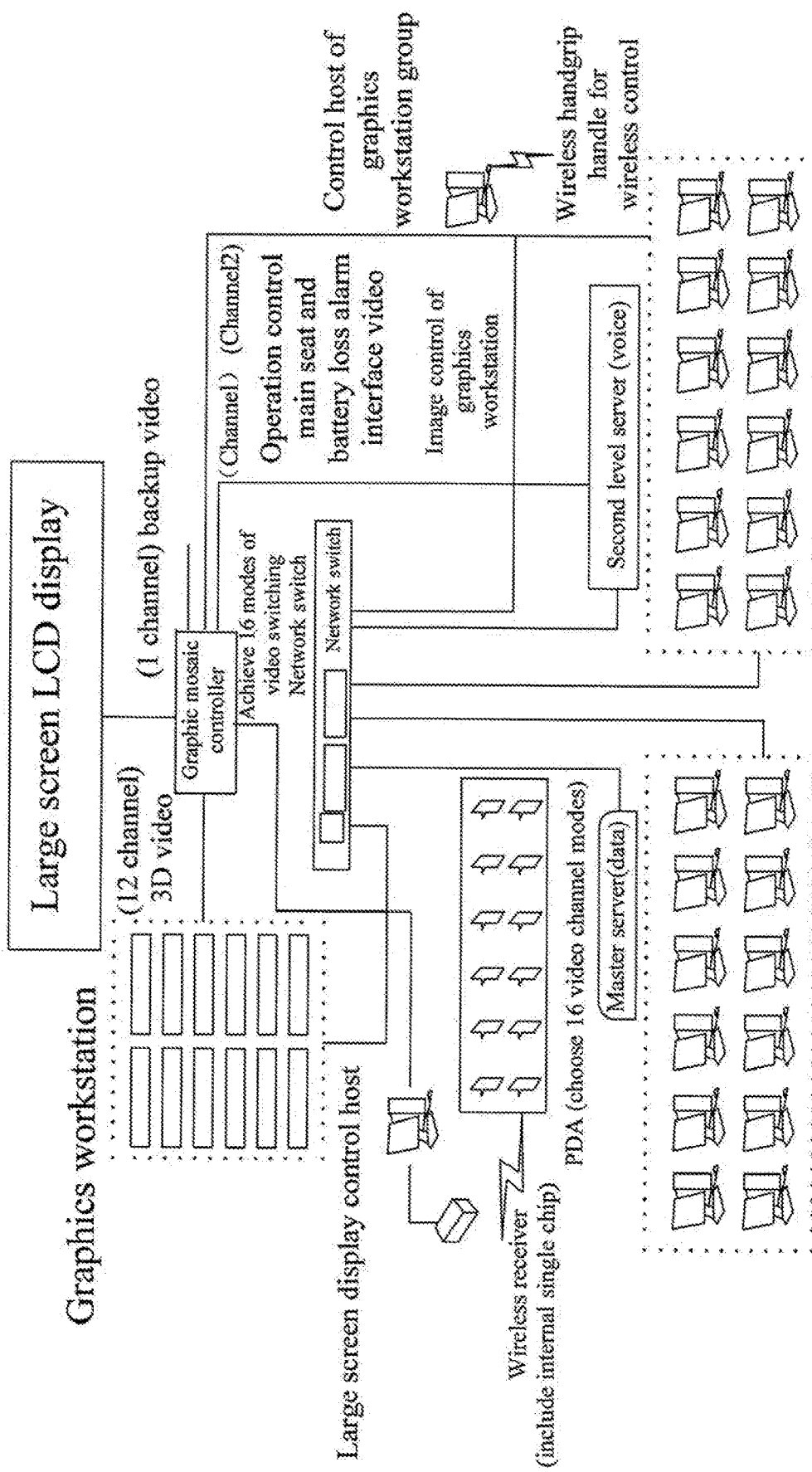
Figure 7:
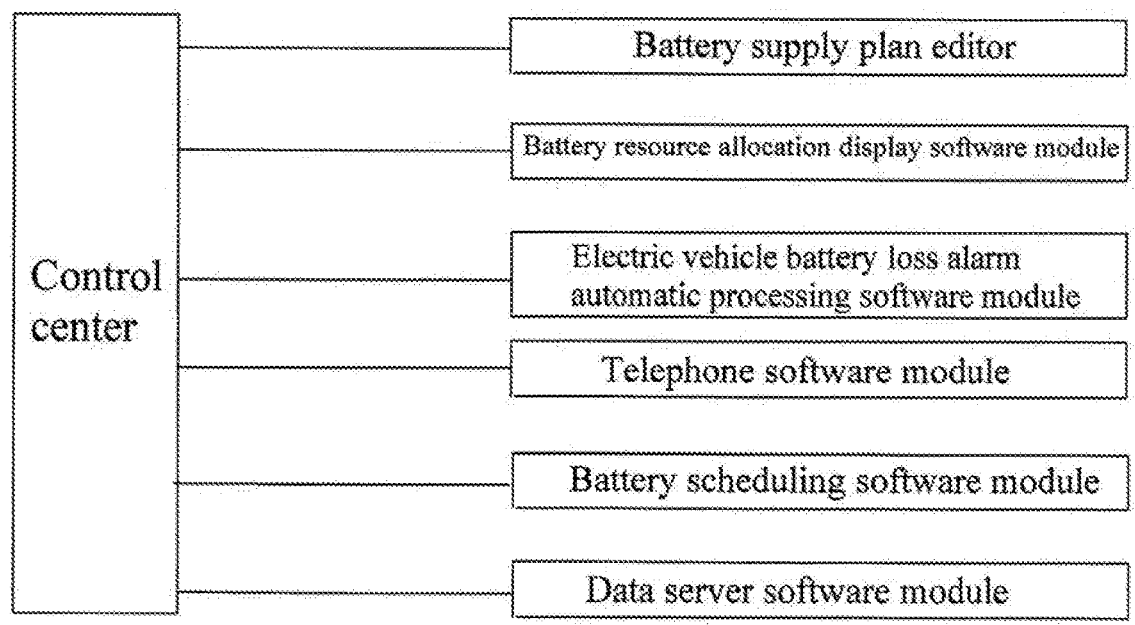
Figure 8:
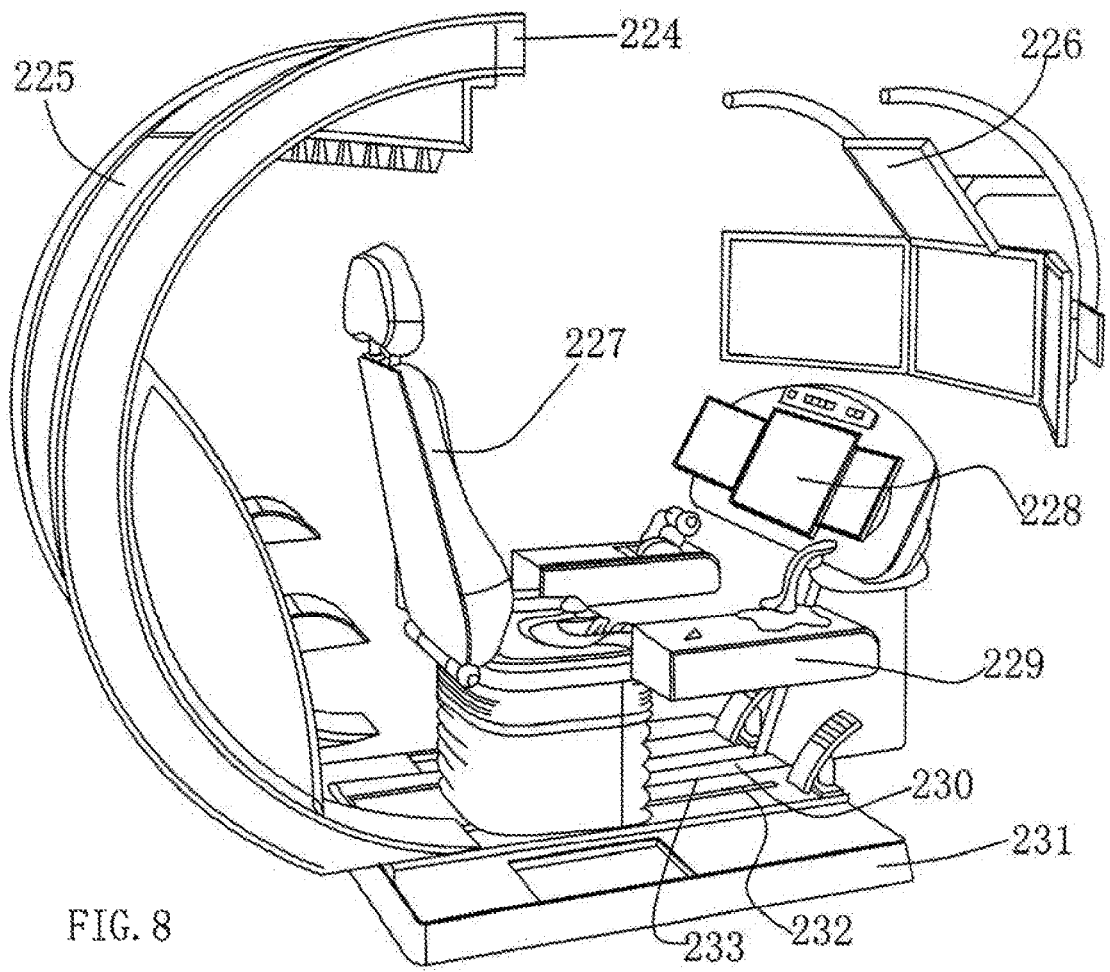
Figure 9:
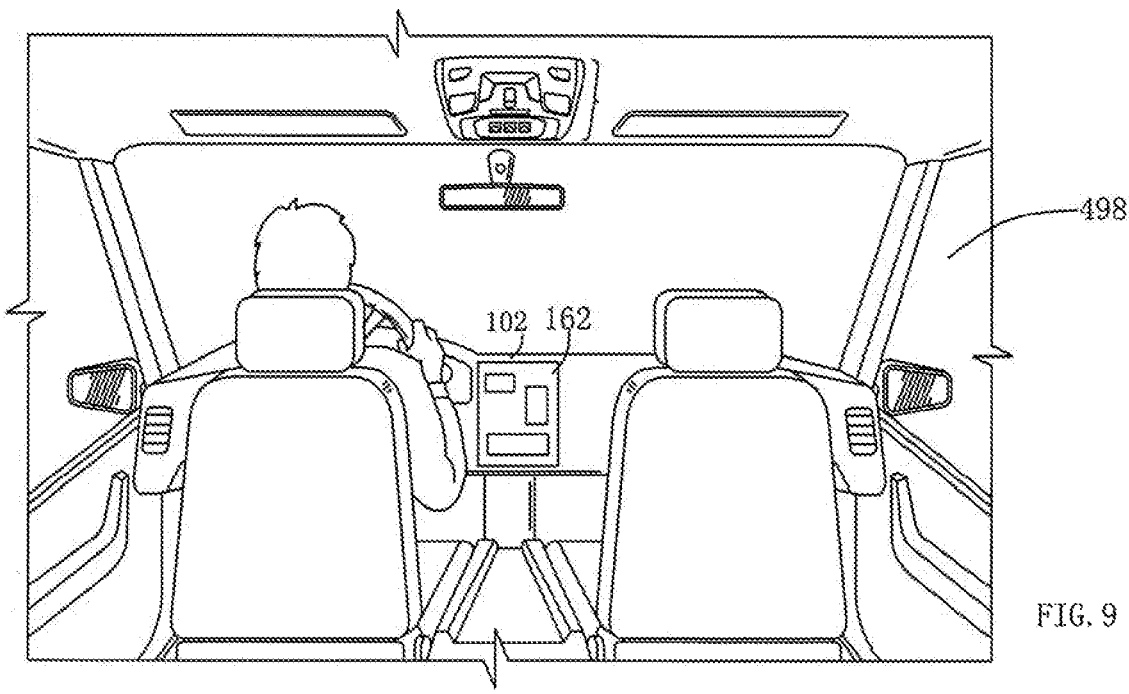
Figure 10:
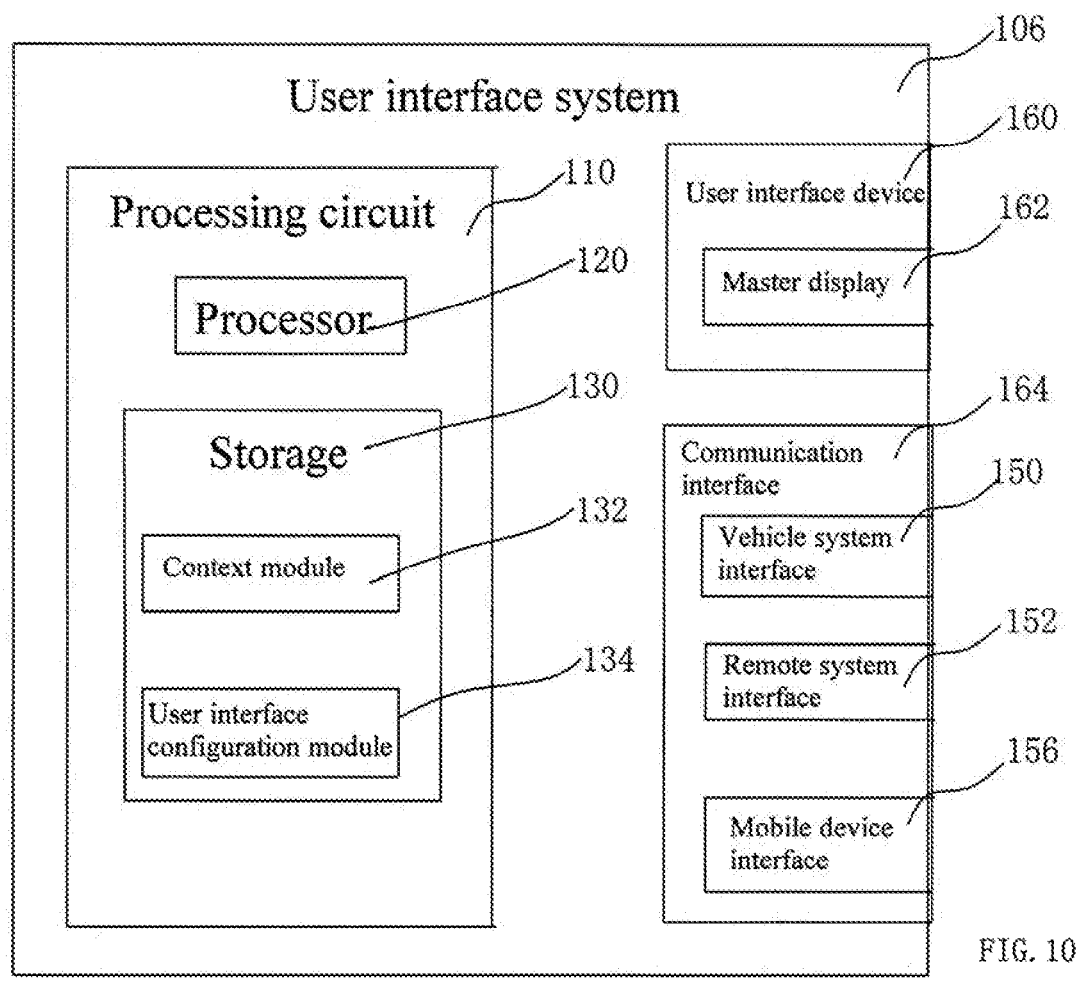
Figure 11:
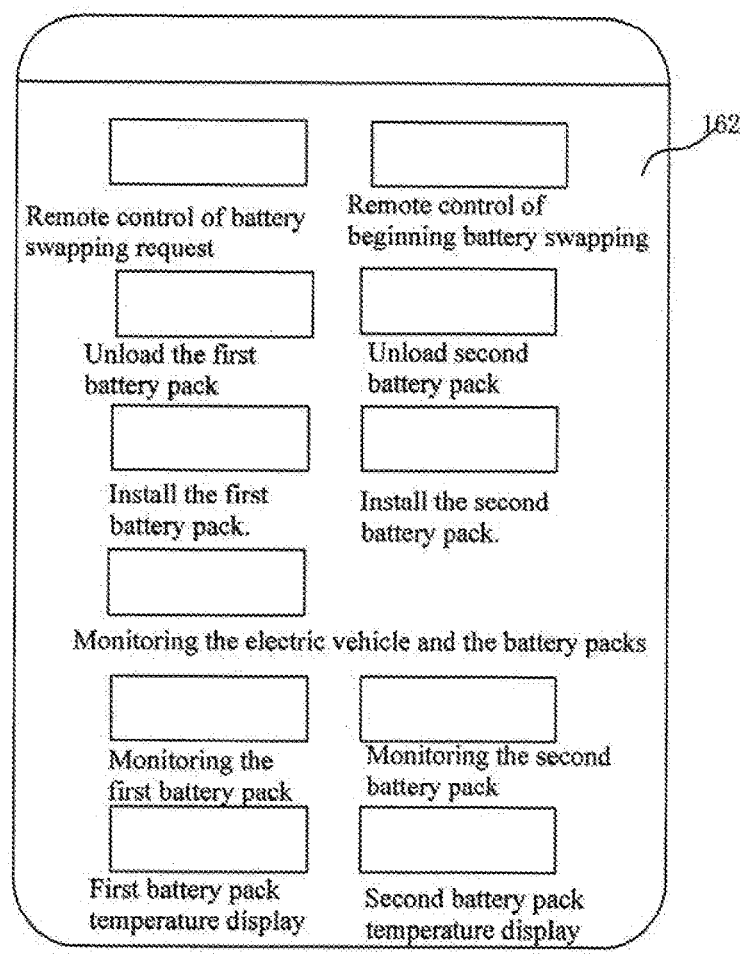
Figure 12:
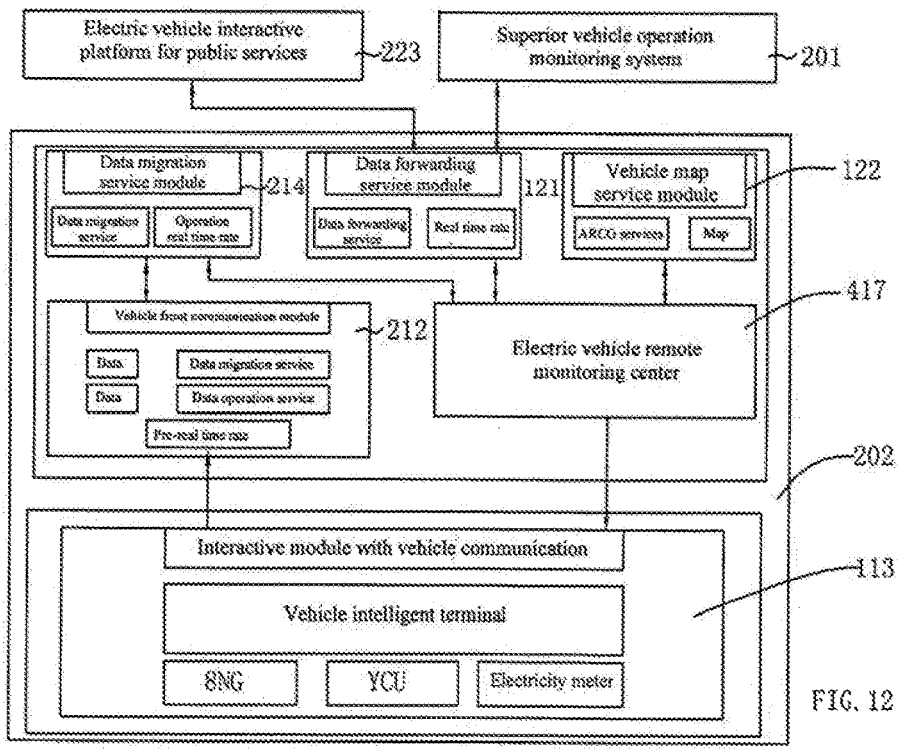
Figure 18:
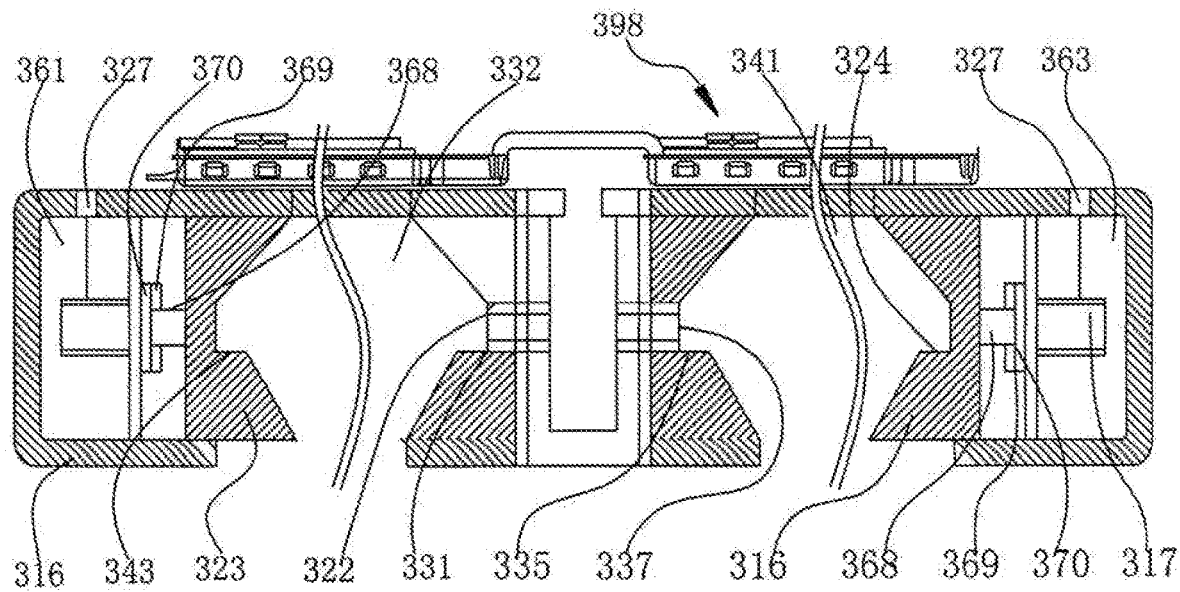
Figure 19:
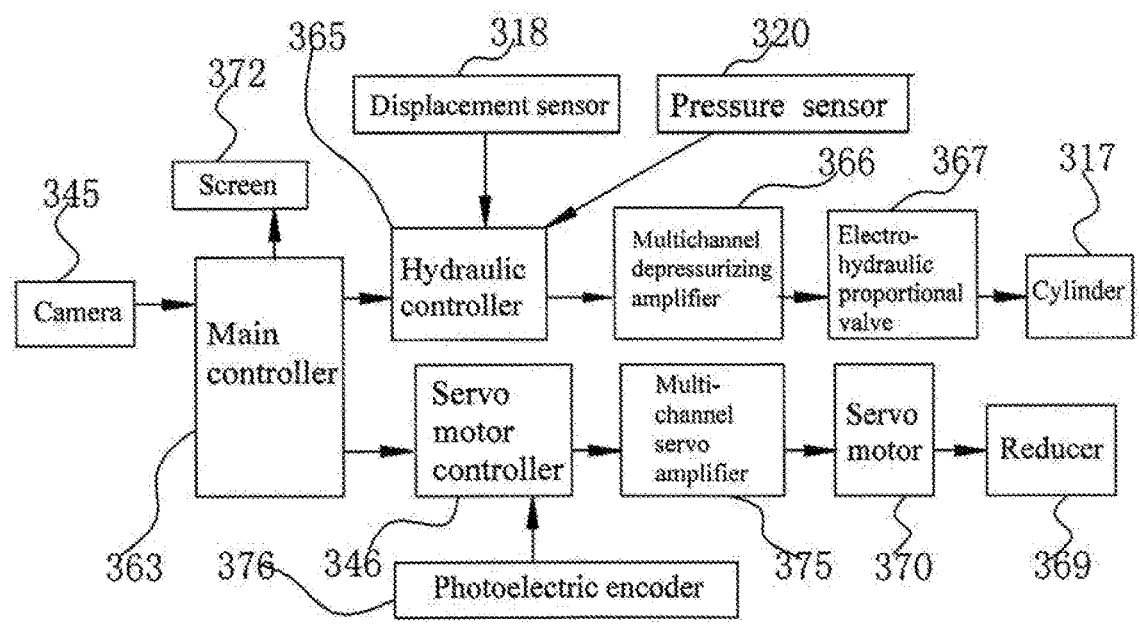
Figure 20:
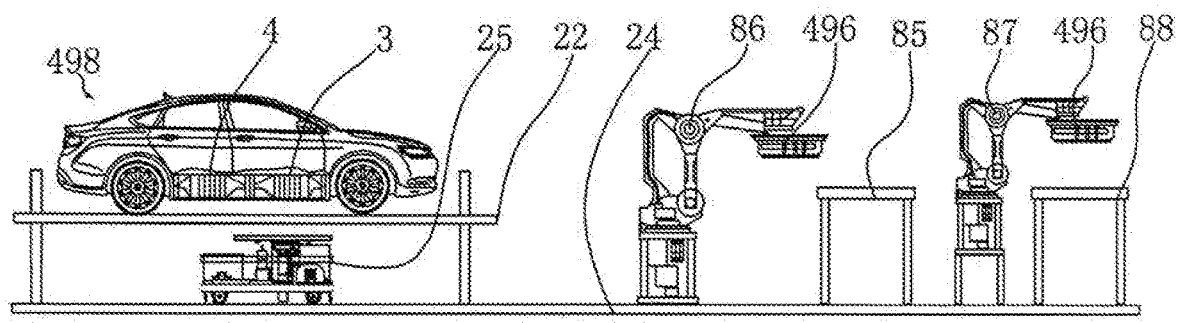
Figure 21:
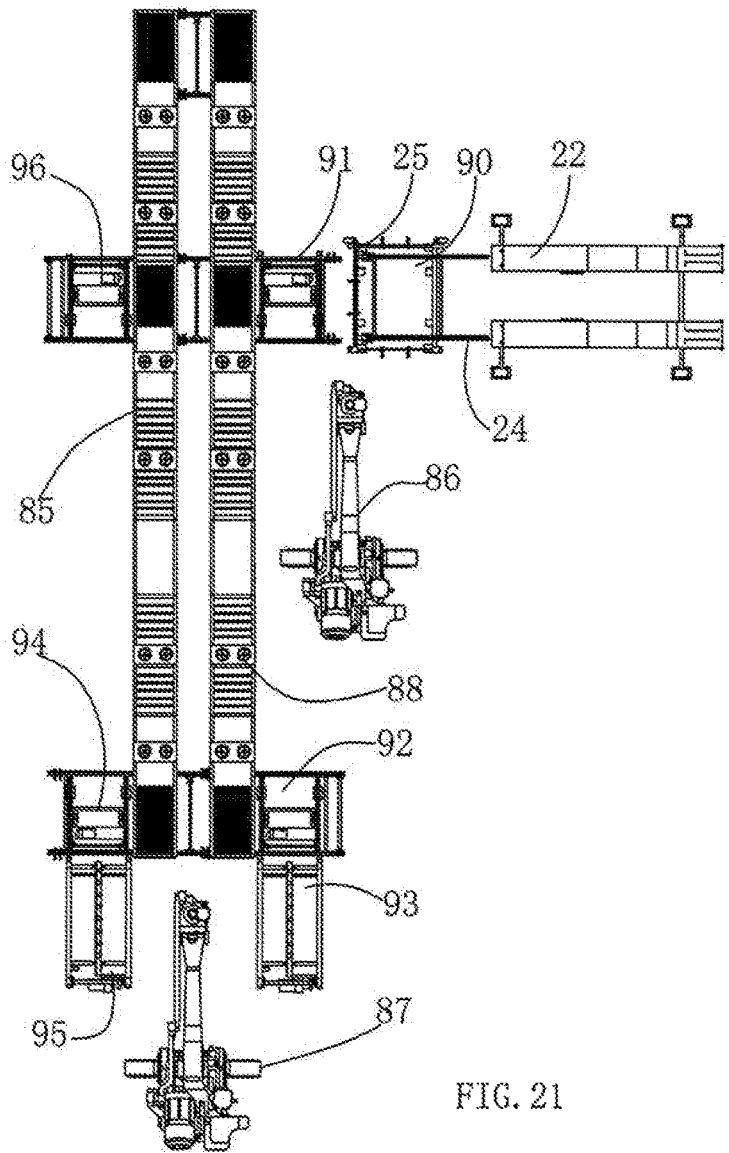
Figure 22:
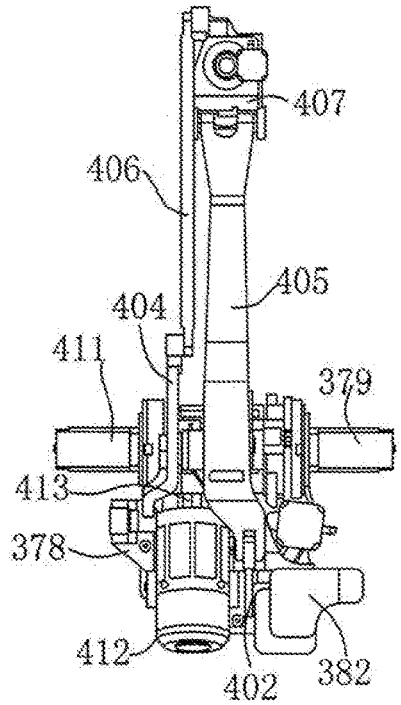
Figure 23:
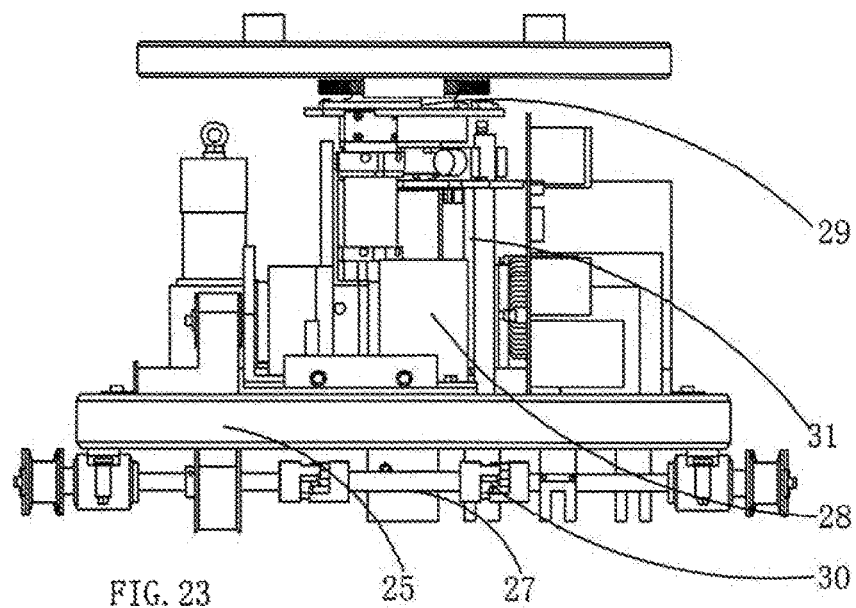
Figure 24:
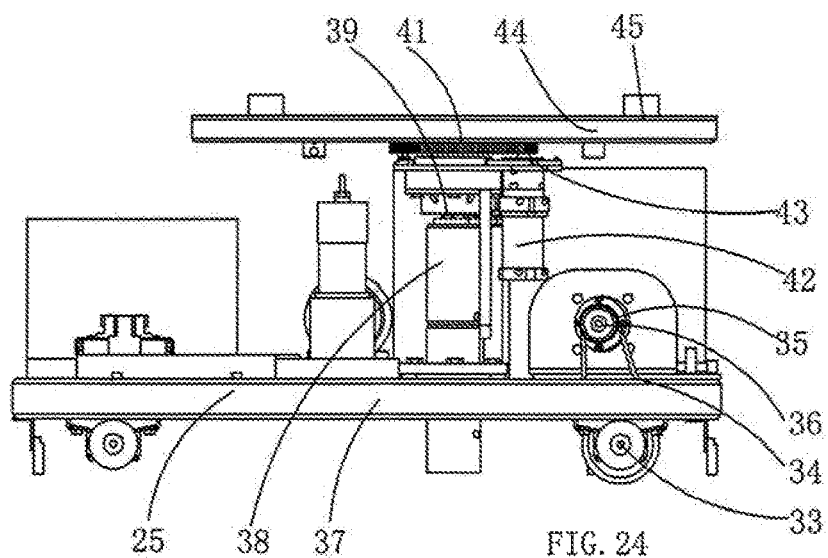
Figure 25:
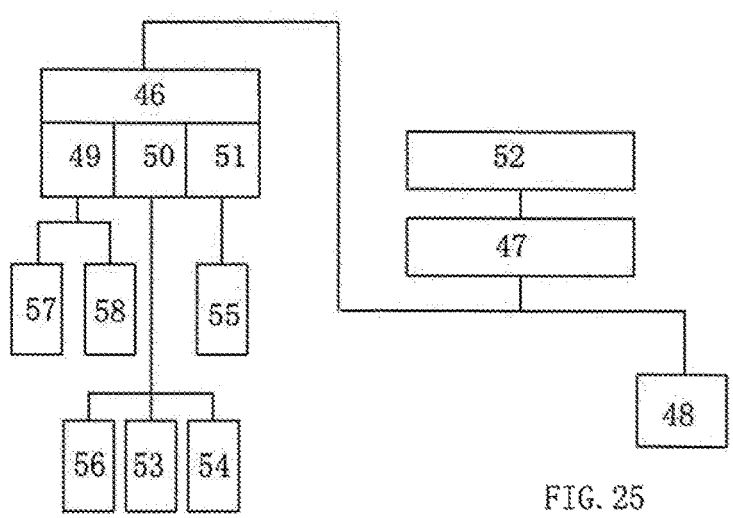

FIG. 1 The diagram of the electric vehicle's energy monitoring and recharge network system based on cloud computer network and remote monitoring FIG. 2 The diagram of the battery swapping station FIG. 3 The diagram of the remote monitoring centre FIG. 4 The diagram of the command seat FIG. 5 The diagram of the battery's (full power) supply plan editor FIG. 6 The diagram of the data terminal of the remote monitoring center FIG. 7 The diagram of the control center FIG. 8 The diagram of operator's control system in the power station FIG. 9 The diagram of the vehicle inside with the main display screen FIG. 10 The diagram of the control system of the user interface configured in the main di splay FIG. 11 The figure showing the setting icon on the main display screen FIG. 12 The schematic diagram of the remote monitoring system of the electric vehicle FIG. 13, FIG. 14 and FIG. 15 The diagrams of the remote monitoring system of the electric vehicle battery swapping system FIG. 16 and FIG. 17 The profiles of the first battery pack and the second battery pack FIG. 18 The sectional diagram of the battery pack swapping and explosion proof system on the electric vehicle chassis FIG. 19 The diagram of the control system of the first battery pack robot and the second battery pack robot FIG. 20 and FIG. 21 The schematic diagrams of the hardware connection of the battery swapping system FIG. 22 The overlook diagram of the robot palletizer FIG. 23 and FIG. 24 The left view and main structure of the ferry robot system FIG. 25 The diagram of the control system of the ferry robot FIG. 26 and FIG. 27 The schematic diagrams of the automatic leveling hydraulic lifting machine FIG. 28 The main view of the robot palletizer FIG. 29 The schematic diagram of the manipulator of the robot palletizer

SPECIFIC IMPLEMENTATION METHODS

Remote energy monitoring and supply network for electric vehicles based on cloud computing network: In FIG. 1 and FIG. 2, the front-end data acquisition and control subsystem 600 consists of a front-end controller, a front-end data processor and memory, a monitoring host, a monitoring extension and monitoring terminals distributed in the monitoring sites. The front-end controller and the front-end data processor and memory coordinate the monitoring host and monitoring extensions and monitoring terminals after receiving the control commands to complete data acquisition, simple processing and storage, and timely data upload. The monitoring extensions have sixteen fields of data interface or control interface, and complete the collection or return control signals of sixteen fields data to adjust equipment. Each standard measurement and control interface provides three types of standard bus: power line, ground line, data line. The monitoring terminal adopts panoramic high-point intelligent monitoring, which adopts panoramic camera and tracking camera linkage mode. While realizing macroscopic large-scale scene monitoring, the system can continuously track and capture detailed information of multiple targets within the monitoring range, and can capture and save characteristic pictures. The alert area can be self defined by the system, and the number of moving targets entering and leaving the alert area is counted. At the same time, the objects passing through the alert area are alerted in real time. Install the camera in the access area of the battery replacement station 419 of the electric vehicle. The video camera takes pictures of the electric vehicles 498 in and out, and the pictures are saved as 24-bit true color images in JPEG compression format. The images are saved in a cyclic overlay mode, and images of license plate numbers are automatically spotted by the system. The information of all vehicles, including the image path, is stored in the database. Monitoring terminals are installed at the following locations in battery swapping station 419: the first robot palletizer 86, the second robot palletizer 87, the ferry robot 25, the four-column lifter 22, the rail 24, the first conveyor line 85 and the second conveyor line 88; the first robot palletizer 86, the second robot palletizer 87, the ferry robot 25, the four-column lifter 22, the first conveying line 85 and the second conveying line 88.

In FIG. 1, data transmission network subsystem 603: it is an integrated system composed of wired/wireless network LAN, 3G/4G mobile Internet, broadband Internet, and it adopts the Protobuf specification to define the format and standard of data and instructions exchanged between all equipment and management platform of the electric vehicle battery swapping station 419. The data transmission between the 3G module and the management platform is encapsulated into UDP or TCP packets according to the upper service protocol, and data parity check and message loss re-transmission mechanism are used to ensure the reliability of the data communication; especially in the communication process between all the equipment of the electric vehicle battery swapping station 419 and management platform, the transmission algorithm based on the TCP protocol is used.

In FIG. 1, backstage management subsystem 602: it includes database, cloud server, cloud host, cloud computing, cloud management and cloud storage services. On one hand, the data collected by various terminals are automatically analyzed and automatically sent to regulate field control devices according to the results of the analysis. On the other hand, it provides customers access to the service for cross platform users, and responds to the monitoring requirements of the authorized users in time, and feedback the data and processing results of the power station to the user side; the background management subsystem also has video analysis function, and it may automatically analyze the video data in real time. If abnormal behavior is found, alarm and alarm signals are sent to the user in time through the client application subsystem by the backstage management subsystem.

In FIG. 1, the client application subsystem 601 includes the remote monitoring center 417, the electric vehicle 498 remote control receiving signal system and the computer terminal and the application software, providing integrated service functions including real-time/timing monitoring, recording query, data analysis and printing, video display and playback, etc.

1. Remote Monitoring Center

From FIG. 3 to FIG. 7, the remote monitoring center 417 includes the large screen LCD, the large screen display control host, the network switch, the graphics splicing controller, the graphics workstation, the control host of the graphics workstation group, the server group and the terminal group; the large screen LCD display and the large screen display control host are electrically connected, the large screen display control host has a display control module that controls the display of the large screen LCD's display, display content and display area, and the large screen LCD display and the large screen display control host are connected to the graphics splicing controller respectively; the graphics splicing controller is connected to the graphic processing station, the graphics splicing controller has the concatenation and stitching module in which the graphics or video or audio are collected from the graphics workstation, and the combination and splicing modules are completed; the network switch is connected to the terminals of the graphics workstation, the graphics splicing controller, the control host of the graphics workstation group and the server correspondingly; the control host of the graphics workstation group is connected with the terminals of the graphic workstation and the server respectively; the control host of the graphics workstation group includes the graphics control modules to control the graphics or video or audio in the graphics workstation; the graphic workstation control host also has a graphics collection module that collects graphics or video or audio from the server and terminals, and the graphics collection module is also connected to camera; the server group may handle the voice or data information in the terminal group, and the server group includes the main server and the second level server, the terminal group includes data terminals and voice terminals.

In FIG. 4, the remote monitoring center 417 is composed of a plurality of seats, each seat runs the same software, and the terminal group comprises:

1. Battery swapping monitoring seats, which monitor and control the progress of battery swapping by displaying software and scheduling software.
2. Battery planning seats, which are mainly for the power station command system to deal with the relevant battery needs information, publish battery supply plan and assist in coordinating battery supply status.
3. Battery transportation management seat, which distributes batteries and dispatches battery transport vehicles through software, so that batteries may be transported to all power stations according to previous plans.
4. Emergency rescue command seat, which provides the three dimensional grid of resources allocation map to the commander to provide the distribution of vehicle resources distribution data, and the commander coordinates the relevant departments or units to dispatch the vehicles to be dispatched according to the distribution data.
5. Swapping station operator seat, which provides the main specific operation for the battery swapping process.

In FIG. 5, the battery (full power) supply plan editor is used to make the battery supply plan. The battery distribution software distributes batteries for each swapping station in the Gantt chart and displays the battery occupancy of each swapping station graphically. The automatic processing software module of electric vehicle's power loss alarm is software module, which is used to receive and process alarm information of electric vehicle's power loss and update battery state. The telephone software is software module, which is used for telephone coordination of the whole system. The battery (full power) resource allocation display software is software module, which presents the resource allocation of the battery (full electricity) in a grid way and provides resources and scheme information in special situations. The data server software module is used to distribute and process the relevant data in the system, and also has the data management function of all the software in the system.

In FIG. 6, each seat in the end group may publish control instructions according to the corresponding authority and work requirements of the seat. The control instruction data includes graphics, telephone audio and others, which may be transmitted to the network switch. The network switch transfers control instruction data to the main server and the second level server. After the logic processing of the main server and the second level server, and then the processed data is transferred to the graphics splicing controller. The graphics splicing controller intelligently realizes the splicing and combination of various data, and finally displays it in the large screen LCD screen. The PDA controller releases the control instruction (i.e. jurisdiction and work requirements of the seat). The control instruction data includes graphics, telephone audio and other instructions, which are transmitted to the network switch. On the large screen, the data information of various terminals and cameras may be displayed in the large screen liquid crystal display screen in time, which is convenient for the people of each seat of the terminal to watch and people may get the information data of the swapping station to coordinate operations properly.

In FIG. 6, remote monitoring center 417 has data terminals and voice terminals, the graphics workstation, the PDA controller, the display control module of the large screen display control host have sixteen kinds of display control modes, and the selection and switching of the display modes of the large screen LCD display may be realized by the graphics splicing controller. The remote monitoring center 417 includes: large screen LCD, large screen display control host, network switch, graphics splicing controller, graphics workstation, graphics workstation group control host, server group and terminal group; network switch is connected with graphics workstation, graphics splicing controller, graphics workstation group control host, graphics workstation group server and graphics workstation group terminal respectively. A large screen LCD screen is used to display graphic, video and audio data after mosaic. Graphics splicing controller is used to extract graphics or video or audio from graphic workstation and perform combination and stitching; graphics workstation group controls the storage, movement, display and deletion of graphics or video or audio in graphic workstation; network switch is connected with graphics workstation and graphics splicing controller, graphics workstation group control host, the server and the terminals. The server is composed of the main server and the second level server; the terminal is composed of the data terminal and the voice terminal, the main server is used to receive and control data information of the data terminal and the second level server is used to receive and control the voice information of the voice terminal; the large screen display control host is connected to wireless receiver and the receiver is connected to the PDA controller by wireless communication. The data instruction information sent by the data terminal is transmitted to the main server through the network switch. After logical operation of the main server, the data information and processing results are displayed through the LCD display screen and the liquid crystal display screen of the data terminal. The speech instruction message sent by the voice terminal is transmitted to the second level server through the network switch, and the logic operation is processed through the second level server. The voice information and the processing results are displayed through the LCD display screen and the LCD screen of the voice terminal; the data and voice instructions sent by the PDA controller is transmitted to the wireless receiver through wireless communication. The wireless receiver sends the data and voice information through the large screen display control host to the graphics splicing controller. Through the logical operation of the main server and the second level server, the data, voice information and processing results are displayed through the LCD and the large screen of PDA controller. The graphic workstation group controls the host, and the data information is transmitted to the main server through the network switch, and after the logical operation is processed through the main server, the data and processing results are displayed through the large screen liquid crystal display.

In FIG. 7, there is a computer in the operator position of swapping station, and a monitoring center is in it. The monitoring center is connected with the battery supply plan editor, the battery distribution software module, the electric car battery alarm automatic processing software module, the telephone software module, the battery planning and dispatching software module, and the battery resources distribution display software module and data server software module.

In FIG. 8, there are several seats in the remote monitoring center 417: battery swapping control seat, battery planning seat, battery transportation management seat; emergency rescue command seat and the operator seats are composed of the following components: the support rod 225 is in an integrated arc structure, which is built from the back of the seat 227, extending to the front seat, the top of the support rod 225 is a lateral part 224, the lateral part 224 tends to horizontal; the visual perception unit 226 is connected with lateral part 224 elastically, which means the visual perception unit 226 may achieve the expansion adjustment; the support bar 225 is connected with the support base 231 through hinges or reaming shaft, so that the tilt angle of the support rod 225 may be adjusted; the converter operator may adjust the support rod 225 forward or backward in accordance with its own needs; the first rail 230, the second rail 233, and the third rail rails 232 are also designed in the support base 231; the supporting point between the auxiliary unit 228 and the support base 231 falls on the first rail 230, making the operational auxiliary unit 228 may move along the first rail 230; the support point between the seat 227 and the support base 231 falls on the third rail 232, so that the seat 227 may move along the third rail 232, and the visual perception unit 226 and the operation unit 228 operate the same software with each seat.

2. The Link Between the Remote Monitoring Center and the Remote System of Electric Vehicle and the Monitoring of Battery from the Remote Monitoring Center.

In FIG. 9, FIG. 10 and FIG. 11, the electric vehicle 498 includes the main display device 162, which is shown as part of the central console 102 that the user may access on the driver seat of the electric car 498 or on the front passenger seat. The main display device 162 plays the following role: showing visual information or user interface device when it receives user's input in the electric vehicle 498. When the electric vehicle 498 enters the communication range of the remote system, it establishes a communication link with the remote system, determines one or more options for interacting with the remote system, and shows one or more selectable icons on the touch sensitive master display 162 in response to electric vehicle enters into the communication range. Selecting the icon showed may initiate one or more options for interacting with the remote control system. The remote control system includes: remotely controlling battery swapping, unloading the first battery pack and the second battery pack, installing the first battery pack and the second battery pack, monitoring the electric vehicle and the battery packs, showing the temperature of the battery packs.

In FIG. 10, the control system 106 may be controlled and reconfigured to appear in the main display 162. The control system 106 includes a user interface device 160, a communication interface 150 and a processing circuit 110. The processing circuit 110 includes a processor 120 and a memory 130, and the user interface device 160 includes a master display 162. The main display 162 is used to show applications and provide detailed information and options for interacting with one or more local or remote systems. The main display 162 is a touch sensitive display, and it includes a touch sensitive user input device that is capable of detecting the user input based on the touch. The main display 162 may include multiple knobs, buttons, tactile user input, and it has many technologies, such as liquid crystal display (LCD), plasma, thin film transistor (TFT), cathode ray tube (CRT), etc. The main display 162 may be an embedded display (such as a display embedded in a control system 106 or other vehicle systems, parts or structures), an independent display (such as a portable display, a display mounted on a movable arm), or a display with any other configuration.

In FIG. 10, the system 106 includes a communication interface 150, which includes a system interface 152, a remote system interface 154 and a mobile device interface 156. The system interface 152 may facilitate communication between the control system 106 and every local vehicle system. For example, the system interface 152 allows the control system 106 to communicate with the local vehicle system (including GPS navigation system, engine control system, transmission control system, HVAC system, battery monitoring system, timing system, speed control system, anti-lock braking system, etc.). The system interface 152 has electronic communication with every parts of the electric vehicle, so the electric vehicle 498 has the ability to receive input from a local vehicle sensor (such as speed sensors, battery temperature sensors, pressure sensors, etc), as well as remote sensors or devices (such as GPS satellites, radio towers, etc). The received input of the electric vehicle may be transmitted through the system interface 152 to the control system 106. The received input of the system interface 152 is used to establish context of the electric vehicle 498 by the context module 132, and the system interface 152 provides wire communication link using USB technology, IEEE1394 technology, optical technology, other serial or parallel port technologies, or any of its appropriate wired links. The system interface 152 may include any number of parts configured to control or promote communication activities in the local vehicle system, such as hardware interfaces, transceivers, bus controllers, hardware controllers, and software controllers. For example, the system interface 152 may be a local interconnected network, a controller area network, a MAY bus, a LIN bus, a Flex Ray bus, a media oriented system transmission, a key protocol 2000 bus, a serial bus, a serial bus, a parallel bus, a vehicle area network, a DC-BUS, a IDB-1394 bus, a SMART wire X bus, a MOST bus, a GA-NET bus, IE bus and so on.

The system interface 152 may use one or more wireless communication protocols to establish a wireless communication link between the control system 106 and the electric vehicle system or hardware components of the electric vehicle. The interface 152 may support communication via Bluetooth communication protocol, IEEE802.11 protocol, IEEE802.15 protocol, IEEE802.16 protocol, cellular signal, shared wireless access protocol-line access (SWAP-CA) protocol, wireless USB protocol, infrared protocol, or any other appropriate wireless technology. The control system 106 may be configured to route information between two or more electric vehicle systems via interface 152. Control system 106 may route information between vehicle system and remote system via the interface 152 of the vehicle system and the interface 154 of the remote system. Control system 106 may route information between vehicle system and mobile devices via the interface 152 and the interface 156 of mobile devices.

In FIG. 10, the communication interface 150 is shown to include a remote system interface 154. The remote system interface 154 is convenient for communication between the control system 106 and any number of remote systems via remote systems and the remote monitoring center 417. The remote system may be any system or device that may interact with the control system 106 through the remote system interface 154 outside the electric vehicle 498. A remote system may include a radio tower, a GPS navigation or other satellite, a cellular communication tower, a wireless router (such as WIFI, IEEE802.11, IEEE802.15, etc.), a capable remote device, a remote computer system or a server with wireless data connections, or any other remote communication that may be communicated wirelessly via the remote system interface 154. The remote system may exchange data within itself through the remote system interface 154.

In FIG. 10, the system 106 is shown to include a processing circuit 110, which comprises a processor 120 and a memory 130. The processor 120 may be implemented as a general purpose processor, a dedicated integrated circuit (ASIC), one or more field programmable gate arrays (FPGA), a CPU, a GPU, a set of processing components, and an appropriate electronic processing unit. The memory 130 may include one or more devices for storing and/or promoting the data and/or computer code of various processes, layers, and modules described in the present disclosure (such as RAM, ROM, flash memory, hard disk memory, etc.). The memory 130 may include volatile memory or non-volatile memory. The memory 130 may include a database component, an object code part, a script part, and it is connected to the processor 120 via a processing circuit 110 for executing computer codes that have one or more processes described in article.

In FIG. 12, the vehicle intelligent terminal of the electric vehicle 498 collects the information of the electric vehicle in real time: the real-time state of the electric vehicle 498, the alarm information, and the remote control center 417 transmitted through the network communication mode. The information collected from electric vehicles 498 includes: BMS, VCU, ammeter, other information, alarm information of electric vehicle 498, etc. Data network communication methods include wireless transmission such as GPRS. The remote control center 417 can obtain GPS information of electric vehicle 498 from the vehicle intelligent terminal. The remote control center 417 obtains the GPS information of the electric vehicle 498, and matches the vehicle map service module 222, and combines the GPS information sent from the vehicle intelligent terminal to obtain the real-time geographic location information of the running vehicle. Through the location of the vehicle, we observe the road condition of the vehicle, the surrounding environment, the distance from the destination or the battery station in the surrounding area, so that the electric vehicle may be selected for service according to the warning threshold analysis.

In FIG. 12, through the vehicle communication interaction module 213, the remote control center 417 obtains the information of the electric vehicle. Combined with the configuration parameters and the alarm threshold of the electric vehicle 498, the instruction to the electric vehicle 498 is formed after the analysis of the remote control center 417. The intelligent terminal of the electric vehicle 498 transmits the data of the information of the electric vehicle 498 directly to the remote control center 417, and may carry out the information transmission in the following way: the pre-vehicle communication service module 212 accepts the data of the basic information of the electric vehicle 498 and saves the data in real time pre-library of the communication service pre-module 212. Through the data monitoring tool of the pre-vehicle communication service module 212, the stored information is monitored in real time, and the intelligent alarm information is generated according to the actual demand. The data migration service in the pre-vehicle communication service module sends the data of each electric vehicle to the data transfer service module, and then sends it to the remote control center 417. The remote control center 417 may also accept instructions from the superior vehicle operation monitoring system 201 to control each electric vehicle separately. The instructions may be: need to swap batteries, need to stop and other remote prompts, alarm instructions, and so on.

When the new electric vehicle joins, the remote control center 417 will analyze the information of the new electric vehicle, and determine the operation of it through the instruction of the superior vehicle operation monitoring system 201, thus putting the new electric vehicle in the net. The remote control center also analyzes the alarm information. By analyzing the severity of the alarm information, the superior vehicle operation monitoring system 201 will send different instructions to the new electric vehicle, and decide whether the new electric vehicle's needs to be met first to ensure its operation safety. Except the corresponding instructions to the electric vehicles, the electric vehicle public service interactive platform 223 also helps. Through the data forwarding service module 221, the data of the electric vehicle information is obtained from the remote control center 417, using Ethernet, RS485, CAN, GPRS and other communication methods, In FIG. 12, the remote control center 417 sets up a communication connection with the electric vehicle 498 again, and it transfers each instruction to the vehicle intelligent terminal of each electric vehicle through the network communication mode. And the user deals with the electric vehicle according to the instructions obtained by the vehicle intelligent terminal.

In FIG. 13, a remote monitoring system for the battery management system of electric vehicles includes a number of battery groups, battery management systems, data remote transmission terminal modules, and remote monitoring centers. Multiple battery packs are used to supply power for electric vehicles. The battery management system is connected to a plurality of battery packs, and the battery management module is used to obtain the running state parameters of a plurality of battery pack. The operating parameters of the battery pack include single battery voltage, battery pack voltage, battery pack charge and discharge current and battery temperature. On one hand, the operating state parameters of the battery pack are used to judge the thermoelectric state of the battery. On the other hand, these parameters are used as inputs for the comprehensive state analysis of the battery pack, such as the analysis of SOC and SOH.

In FIG. 14, the battery management system includes the BMS master controller; the current collector module, which is used to collect the battery charge current and discharge current; the voltage collector module, which is used to collect the cell single voltage and the total battery voltage; the temperature measurement sub module, which is used to measure the battery temperature; the SOC estimation module, which is used to estimate the residual charge of the battery, ensure reasonable use of batteries, prevent battery's over-discharge and over-charge, and prolong battery life. The display module is touch screen for showing the running state parameters and operation conditions of electric vehicle;

the management sub module of charging and discharging manages charging and discharging process reasonably according to actual needs to guarantee safety; the data communication module is used to realize the data exchange and sharing of between the electric vehicle 498 and other vehicle terminals, such as the remote transmission terminal on vehicle, the human-computer interaction interface, and so on; the battery balancing sub module is used to judge the voltage of the battery monomer to deal with situation automatically, such as the unbalanced state of the battery. The battery fault diagnosis module is used to remind the user of the fault location in time to avoid accidents or safety problems when the battery has been overcharged and over-played. The above sub modules are powered separately and interact with each other through the CAN bus inside the system. The BMS master controller in the battery management system is the main node of the system, and it communicates with each module through the internal CAN bus and gets the data of the battery running state parameters and so on. The remote data transmission terminal module uses GPRSDTU, and it realizes two-way communication with the battery management system through the CAN bus. GPRSDTU is carried on the CAN network of the BMS as the remote transmission terminal of the vehicle data. The data remote transmission terminal module includes communication sub module, GPRS sub module, electronic module and microprocessor. The communication sub module includes a CAN interface and at least two serial ports. The communication sub module communicates with the battery management system through the CAN interface and receives the CAN message information uploaded by the battery management system. The communication sub module communicates with the GPRS sub module through the serial port, and it may reserve the RS232 interface, and the PC machine may configure the GPRSDTU through the interface. The GPRS sub module uses GPRS communication mode to communicate with the remote monitoring center, and the communication protocol adopts the TCP/IP protocol. In this implementation example, the GPRS sub module selects the SIM900A chip to realize the GPRS function.

In FIG. 15 and FIG. 2, in the remote monitoring center 417, vehicle device main controller 490 includes the main control module, the CAN bus communication module 493, the 3G/4G wireless communication module 492, the GPS data receiving processing module 491, and the user interaction module 495; the CAN bus communication module 493 is connected to the main control module through the SPI bus, and the 3G/4G wireless communication module, the GPS data receiving processing module 491 and the user interaction module are both two-way connected with the main control module through the serial port.

In FIG. 15, the interior includes memory, GSM baseband, GSM radio frequency, and there are antenna interface, video interface, power interface, LCD interface, UART interface, SIM interface, and GPIO/key interface outside. The electronic module is connected with the communication module, the GPRS sub module and the microprocessor respectively for supplying the communication sub module, the GPRS sub module and the microprocessor, and the electronic module is 24V power supply on vehicle. When the power supply is supplied, the 24V DC power supply needs to be converted to supply power. The microprocessor is the monitoring center of the whole data remote transmission terminal module, which can complete the configuration of the GPRS sub module and pre-process the uploaded data of the battery management system. The remote monitoring center and the data remote transmission terminal module carry out two-way communication through GPRS. The remote monitoring center is oriented to the user, and it obtains the data of the battery management system in real time. The data is parsed and displayed to the user, and the analysis and playback function of the data is provided.

The remote monitoring center 417 monitors and handles the emergency of the battery: when the electric vehicle 498 is running, the remote monitoring center 417 and the data remote transmission terminal module carry out two-way communication through the GPRS. The battery management system is connected with a number of battery groups, and the running state parameters of multiple battery groups are obtained in real time. The data remote transmission terminal module realizes two-way communication with the battery management system through the CAN bus, including the communication sub module, the GPRS sub module, the electronic module and the microprocessor. In real-time acquisition of battery management system data, data analysis and protocol analysis are showed to users to provide data analysis and playback function. If the first battery pack 3 suddenly reaches the warning temperature such as 150 degrees, the remote monitoring center immediately notifies the user to switch from the first battery package 3 to the second battery pack 4 by the battery swapping system 398 on the chassis of the electric vehicle. And if the first battery pack 3 exceeds the warning temperature and is still rising. After the remote monitoring center immediately notifies the user, the first battery pack robot system 361 begins to work, and the first bracket 323 installed in the lower end of the connecting rod 368 is moved away from the first battery pack 3 with the connecting rod 368. Then the first load-bearing platform 443 on the first bracket 323 is gradually separated from the second fixed platform 329 of the first battery pack 3, the first bracket 323 is separated from the first battery pack 3. Finally, the first battery pack 3 automatically falls off the electric vehicle chassis 2 and falls onto the road surface. When the second battery pack 4 suddenly reaches warning temperature such as 150 degrees, switching the second battery pack 4 to the first battery pack 3 starts immediately. If the second battery pack 4 temperature exceeds the warning temperature and is still rising, the remote monitoring center immediately notify the user to cooperate immediately to start the second battery pack robot system 363. And the second bracket 316 installed at the lower end of the connecting rod 368 is moved away from the second battery pack 4 with the connecting rod 368 under the driving force, and the second load-bearing platform 324 on the second bracket 316 is gradually separated from the second fixed platform 323. The second bracket 316 is separated from the second battery pack 4, and the second battery pack 4 automatically falls off the electric vehicle chassis 398 and finally falls onto the road surface. If the first battery pack 3 and the second battery pack 4 simultaneously reach the warning temperature and is still rising without control, the remote monitoring center immediately notifies the user, starting the first battery package robot system 361 to move the first battery package 3 away and the second battery pack robot system 363 to move the second battery package 4 away to quickly drop the first battery pack 3 and the second battery 4 at the same time.

3. Battery Swapping System 497 and Battery Swapping System 398 on the Electric Vehicle Chassis In FIG. 2, FIG. 20 and FIG. 21, the battery swapping system 497 includes the first monitoring station 127, the second monitoring station 128, the third monitoring station 129, the first robot palletizer 86, the second robot palletizer 87, the ferry robot 25, the four column lifter 22, the rail 24, the first conveyance line 85 and the second conveyance line 88; the ferry robot 25, the four column lifter 22, the first conveyance line 85 and the second conveyance line 88, the first robot palletizer 86 and the second robot palletizer 87 are connected through the local industrial Ethernet connection or wire/wireless network. The intelligent communication terminal integrates the scheduling software, and the scheduling software and the intelligent communication terminal are connected through the digital communication link. The battery swapping system 497 also includes the server, the printer, the communication management machine of the distribution system and the electrical information acquisition terminal are connected to the network switch of the battery swapping monitoring system through the local industrial Ethernet. The network switch is connected to the communication gateway of the superior system by the local industrial Ethernet; the intelligent communication terminal of the battery swapping monitoring system is connected to the network switch through the local industrial Ethernet; the intelligent communication terminal and the battery swapping system 497 are connected by the CAN bus. The PLC (Programmable Logic Controller) of the above equipment control the whole swapping process of the first battery pack 3 and second battery pack 4, the fault signal, the motor module working state, the temperature, the electric voltage, the current, the battery temperature, SOC, the end power and battery's connection state are uploaded to the dispatching software through intelligent communication terminal. Each step of swapping the battery is controlled, commanded and guided by the monitoring center computer. The video server of the video surveillance system is connected with the communication gateway of the superior system through the local industrial Ethernet. The data server stores the historical data of the monitoring system, and the front server collects and parses the relevant real-time data and sends it to other computers. The security monitoring workstation is used to monitor and control the video surveillance system. Communication gateway may realize the conversion between CAN bus and local industrial Ethernet. There are 24 ports in the network switch, which are divided into VLAN (Virtual Local Area Network), virtual LAN to realize communication between subsystems. The first monitoring station 127, the second monitoring station 128 and the third monitoring station 129 are emergency backup systems after finding any fault of the remote monitoring center 417.

In FIG. 18 and FIG. 19, the battery swapping system 398 on the electric vehicle's chassis includes the first battery pack robot control system 361 and the second battery pack robot control system 362, including the total controller 363, the hydraulic controller 319 and the servo motor controller 364, the hydraulic controller 319 and the servo motor controller 364 all connected with the total controller 364. In addition, the hydraulic controller 319 is connected with a multi-channel decompression amplifier 366, the multichannel decompression amplifier 366 is connected with the electro-hydraulic proportional valve 367, and the electro-hydraulic proportional valve 367 is connected to the oil cylinder 317, which is connected to the mechanical hand rod 368 to move up and down; the servo motor controller 364 is connected with the multiplex servo amplifier 375, and the multiplex servo amplifier 375 is connected to the servo motor 370, which is connected to the connecting rod 368, the servo motor 370 is connected to the connecting rod 368 through the reducer 369; the hydraulic controller 319 is also connected with the displacement sensor 318 for detecting the moving distance of the connecting rod 368 and the pressure sensor 320 for detecting the hydraulic pressure in the cylinder 317, and the servo motor controller 364 is also used to detect the photoelectric encoder 376 of the reducer 369. The general controller 363 is also provided with a video camera 371 for recording the motion condition of the video and a display screen 372 for displaying the motion condition. The hydraulic controller 319 and the servo motor controller 364 communicate with the master controller 363 through the CAN bus. The total controller 363 receives the instruction from remote control terminals through the RS232 data line, and controls the executions of each manipulator by the hydraulic controller 319 and the servo motor controller 364 under the CAN bus's assignment task. The output end of the hydraulic controller 319 connects the multichannel decompression amplifier 366, and the oil cylinder 317 is controlled by the electro-hydraulic proportional valve 367. The output end of the servo motor controller 364 is connected to the multiplex servo amplifier 375, the output end of the multiplex servo amplifier 375 is connected to the servo motor 370, and controls the reducer 369 through the servo motor 370. The environment is collected through the camera 371, and the operation process of the manipulator is displayed through the display 372. The displacement sensor 318 is set on the manipulator of robot to avoid collision between self and external environment.

In FIG. 23 and FIG. 24, the ferry robot 25 includes three degrees of freedom in the X axis, the Z axis, and the R axis, which are the straight line walking mechanism 27, the hydraulic lifting mechanism 28, and the angle correction mechanism 29. The linear walking mechanism 27 is located at the bottom of the ferry robot 25, including the pulley 33, the universal coupling 30, the belt 34, the first servo motor 35, the first reducer 36 and the base 37, and the front two pulleys are robot power devices, which is connected with a group of universal coupling and the two pulleys on the back end are driven devices. The first servo motor 35 is connected with the expanding sleeve of the first speed reducer 36, and the power transmission of the first speed reducer 36 and the pulley 33 is realized through a belt, and the driving pulley 33 is straight on the slide rail. The end of the linear walking mechanism 33 is arranged with three photoelectric switches, which is matched with the original point baffler and the front and back two limit gears successively, and provides the PLC control system 46 with signals of the switch to realize the robot's origin search and reset and stop its cross boundary operation; the front limit baffler, the original baffler and the back limit baffler are arranged sequentially along the lines, and the origin stop is located between the front limiting gear and the back limiting gears. The hydraulic lifting mechanism 28 is located in the upper part of the base of the linear walking mechanism 27, including two hydraulic telescopic cylinders; the first level hydraulic cylinder 38 is located at the lower part of the second level hydraulic cylinder 39, and the second level cylinder 39 carries out the expansion movement after the first hydraulic cylinder 38 is fully extended; the first and the second level hydraulic cylinder have welded crossbeam on one side separately and are arranged with the anti-rotating beam. The anti rotating beam cooperate with two anti-rotating holes on the welded crossbeam of the first level hydraulic cylinder and the welded crossbeam on the base, so as to prevent the rotation of the battery along with the lifting process of the hydraulic mechanism 28, the other sides of the first and the second level hydraulic cylinder are respectively set with the rack 31, the encoder 32, the baffler and the first proximity switch. The baffler cooperates with the proximity switch, and the first proximity switch is set at the bottom end of the welded cross beam of the first hydraulic cylinder. When the first level hydraulic cylinder 38 completely extends, the baffler triggers the switch signal of approaching the switch, the second hydraulic cylinder 39 starts to telescopic movement; the rack 31 on the side of the second hydraulic cylinder 39 is meshed with the encoder 32 through the gear. After calculating revolutions of the encoder 32, the raising height of the second hydraulic cylinder 39 is got, the encoder 32 is connected with the PLC control system 46, and then the PLC control system 46 begins to count at high speed. The angle correction mechanism 29 is located at the upper end of the hydraulic lifting mechanism 28, including the installation of the fixing fixing flange 40, the small and large gear 41, the second servo motor 42 and the second speed reducer 43, etc. The fixing fixing flange 40 is stalled with the second level hydraulic cylinder 39, the second servo motor 42, the second reducer 43, the size gear 41 are installed on the fixing fixing flange 40 in order; a small gear is mounted on the top of the second servo motor 42, a large gear is installed on the second level hydraulic cylinder 39, and the small and large gear go on mechanical meshing, rotating under the second servo motor's drive. The lower end of the large gear is arranged with a block, and three second proximity switch is arranged on the fixing flange 40; the large gear triggers signals of the rotating left and right limit and the signal of the original reset switch in order during the rotation process to ensure that the large gear rotates in the specified range. The upper end of the angle correction mechanism 29 is equipped with a battery tray 44, and the revolving center of the big gear is concentric with the gravity center of the battery pack tray 44. The battery box tray 44 is equipped with four limit block 45, which is coupled with four protrusions at the bottom of the battery pack box of the electric car to be changed to realize adjustment and reliable fixation of the battery box. The battery pack tray 44 is equipped with an ultrasonic distance measuring sensor 53 and a DMP sensor 54; the ultrasonic distance measuring sensor 53 is used to measure the distance between the battery tray 44 and the chassis of the vehicle; the DMP sensor 54 cooperates with the reflector plate mounted on the chassis of the vehicle to search for the location of the counter plate target position and get the horizontal angle deviation of the ferry robot and the vehicle. The linear walking mechanism 27 and the hydraulic lifting mechanism 28 are in linkage; only when the linear travel and the vertical lifting of the ferry robot 25 reach the set position, the angle correction mechanism 29 starts to move; only the battery tray 44 of the angle correction mechanism 29 reaches the expected effect, and the hydraulic lifting mechanism 28 starts to start again. The linear walking mechanism 27 and the angle correction mechanism 29 are driven by the servo motor, which is connected with the corresponding encoder, and each encoder is connected with a corresponding driver; the driver sends the position pulse signal to the servo motor, and the encoder sends the motor's rotation information to the driver to form full closed loop control of the position mode.

In FIG. 25, the PLC control system 46 in the control system diagram of the ferry robot 25 is the core of the movement control of the ferry robot 25, including the touch screen 47, the wireless communication module 48, the OMRON PLC controller 49, the A/D module 50, the D/A module 51 and so on; the wireless communication module 48 communicates with the touch screen 47 through the second port RS130, the OMRON PLC controller 49 communicates with the touch screen 47 through the first serial port RS126, and the touch screen 47 communicates with the background monitoring system 52 through industrial Ethernet; the ultrasonic ranging sensor 53, the DMP sensor 54, the hydraulic proportional flow valve 55, each encoder 56, the proximity switch 57, the photoelectric switch 58 and other devices have real time data transmission communication with the PLC control system 46. The ultrasonic distance measuring sensor 53 and the DMP sensor 54 are connected with the A/D module 50 in the PLC control system 46 to convert analog signals collected by the sensor into digital signals and transmit it to the PLC control system 46. The hydraulic proportional flow valve 55 is connected with the D/A module 51 in the PLC control system 46, and transforms the digital control signal of the PLC control system 46 into analog flow control information to realize the speed control of the hydraulic lifting mechanism 28. The encoder is connected with the A/D module 50 of the PLC control system 46, and the encoder 56 collects the single rack's rising height of the second level hydraulic cylinder 39 and obtains the lifting distance of the second level hydraulic cylinder 39 through calculation. Then the data is fed back to the PLC control system 46 to form the full closed loop control during the lifting process. The proximity switch 57 and the photoelectric switch 58 are connected with the OMRON PLC controller 49 in the PLC control system 46 to transmit the limit position information of the ferry robot 25 in real time and trigger the interruption mode and the high-speed counting mode of the PLC control system 46 to realize the accurate and rapid action of the ferry robot 25 in the specified range.

In FIG. 26, a four column lifter with the vehicle running plate 15 is composed of the first column 13, the second column 18, the third column 19, the fourth column 20, the cantilever beam 16, the cross beam 17, the running plate 15, and the inclined plate 21. An opening 23 is arranged on the beam between the first column 13 and the second column 18, so that the ferry robot 25 enters the four column lifter 22, and the beam 17 is set between the third column 19 and the fourth column 20. The first column 13, the second columns 18, the third columns 19 and the fourth column 20 are installed on the mobile rack 7 and moved up and down along with the moving frame 7 to raise the vehicle running board 15 to the appropriate position. The inclined plate 21 is connected with the running plate 15 to facilitate the running board of the upper and lower fourth column lifter 22 of the electric vehicle 498.

In FIG. 27, the bottom of the lifter fixed frame 1 equipped with four or more symmetrical rolling wheels, and each lifter column is composed of a fixed frame 1, a power unit 2, a hydraulic cylinder 203, a lifting chain 204, a detecting plate 5, a detecting switch 6, a movable frame 7, a sprocket seat 11, and a sprocket 12. In the pile column of the fixed frame 1, a strip detecting plate 5 is fixed with a number of equal gaps, and the bottom of the upper end of the mobile shelf is provided with a detecting switch 6, which is matched with the detecting plate 5. When the detecting plate 5 is in the range of the detecting switch 6, the detecting switch 6 may output the signal. Gaps are set on the detecting board 5. When the detecting switch 6 detects a gap, the detecting switch 6 does not output the signal. Backwards and forwards, the signals generated by the detecting switch 6 of the lift column's detecting switch 6 are all connected to and calculated by the data line connection controller 8, and the data calculated by the controller 8 is displayed by the line connection display panel 9 at the same time. The upper end of the mobile frame 7 is provided with a sprocket seat 11 and a sprocket 12, and the sprocket 12 supports the lifting chain 204. One end of the lifting chain 204 is connected to the movable frame 7, and the other end is connected to the fixed rack 1. One end of the hydraulic cylinder 3 is connected with the base of the fixing frame 1, and the other end is connected with the sprocket seat 11. When the hydraulic cylinder 203 rises and falls, the sprocket wheel 12 on the sprocket seat 11 rolls together with the lifting chain 204, and the mobile frame 7 rises and falls along to make the detecting plate 5 and the detecting switch 6 work and produce the electrical signals.

In FIG. 28, FIG. 29, and FIG. 22, the robot palletizer grip 496 is installed at the bottom of the wrist base of the robot palletizer 415 through the grip connection flange 410. By controlling the cable, the operation control system connects and starts the drive motor of the rotating frame, the vertical arm drive motor, the grab drive motor and the transverse arm drive motor. According to the position of the palletizing object, the drive motor of the rotating frame may start the rotating frame to turn around 180 degrees, start the vertical arm drive motor and the cross arm drive motor to move the cross arm and connecting rod 3 through moving up and down of the palletizing jig under the wrist pedestal's drive with the help of three parallel four bar mechanism and the motion vice mechanism to grab the target object in the desired position. When the horizontal arm drive motor drives, it moves up and down through the balance block and the first connecting rod 1 to drive the horizontal arm, and drives the third connecting rod 3 to move up and down together. A balance block is installed in the horizontal arm drive motor reducer with the help of the balance block mounting bracket. The palletizing fixture at the bottom of the wrist base, which is connected to the front end of the horizontal arm, balances the weight of the target objects so that the robot is balanced and safe in work. According to the position of the target object, the vertical arm drive motor drives the vertical arm and the second connecting rod 2 to move forward and backward. At the same time, the horizontal arm and the third connecting rod 3 are moved up and down in parallel. Since the lower end of the vertical arm is connected with an accumulator balancer, the vertical arm moves forward and backward during the transmission process of the vertical arm driving motor. When the horizontal arm moves up and down to grab objects, the energy storage balancer has a set of energy storage springs, which can balance the cushioning effect to make the work stable and safe in the process of stacking and hoisting. The robot palletizer may realize fast palletizing battery packs. The load capacity of the robot palletizer is more than 500 kilogram and the cycling capacity is more than 800 times per hour. The rotary machine seat 378 is installed on the upper part of the base 377, and the drive motor 380 of the rotary frame is installed on the rotary machine seat 378. The drive motor 380 of the rotary frame may rotate on the upper part of the base 377 with the help of the transmission gear 381 and the reducer's rotary machine seat 378. The lower end connecting fork of the vertical arm 403 is installed on the rotary machine base 378 with bearing and connecting shaft on the two sides of the vertical arm. The drive motor 379 of the cross arm is installed on one side of the rotary machine seat 378 of the vertical arm 403 through the reducer, and the balance block 382 is connected by the balance block mounting bracket 383 to the cross arm drive motor reducer. The lower end of the connecting rod 402 is connected with the balance block support 383 by bearing and connecting shaft. The upper end of the connecting rod 402 is connected to the rear end of the transverse arm 405 by bearing and connecting shaft. The rear part of the transverse arm 405 is connected to the upper end of the vertical arm 403 by bearing and connecting shaft. The front arm of the transverse arm 405 is connected to the wrist base 407 by bearing and connecting shaft. The grip's drive motor 408 is installed on the wrist base 407, and the lower part of the gripper drive motor 408 is connected with the gripper's drive motor reducer 409. The gripper's connection flange 410 is connected with the gripper's drive motor reducer 409. The vertical arm drive motor 411 is mounted (at the other side of the vertical arm 403) on the rotary machine seat 378 through the vertical arm drive motor's decelerator. The energy storage balancer 412 is mounted on (on the other side of the vertical arm 403) on the rotary machine seat 378 by bearing and connecting shaft. The energy storage balancer 412 is set with a spring, a expansion shaft 413, and the front end of the telescopic shaft 413, which are connected to the connecting fork of the vertical arm's lower end through bearing and connecting shaft. The upper end of the second connecting rod 401 is connected to the rotary machine seat 378 by bearing and connecting shaft, the bottom end of the second connecting rod 401 is connected to one end of the connecting rod support 404 by bearing and connecting shaft. The other end of the connecting rod bracket 404 is connected to the third connecting rod 406 through bearing and connecting shaft, and the third connecting rod three 406 is movably connected to the wrist base 407 through bearing and connecting shaft. The lower end part of the connecting rod bracket 404 is movably connected to the upper end part of the vertical arm 403 through bearing and connecting shaft. The connecting rod bracket 404 is triangular, and three movable connecting bearing holes are arranged to form a three motion auxiliary mechanism. The vertical arm 403, the first connecting rod 402, the balance block 382 and the rear arm 405 constitute the first parallel four rod mechanism; the transverse arm 405, the third connecting rod 406, the wrist base 407 and the connecting rod support 404 constitute the second parallel four rod mechanism; the second connecting rod 401, the vertical arm 403, the connecting rod support 404, and the rotary machine seat 378 compose the third parallel four rod mechanism. The first parallel four rod mechanism, the second parallel four rod mechanism, the third parallel four rod mechanism and the three motion subsidiary mechanism constitute the balance chain. The robot palletizer is equipped with an operation control system, which uses a programmable controller for programming control. The robot palletizer 415 is used for the first robot palletizer 86 and the second robot palletizer 87.

In FIG. 20, FIG. 21 and FIG. 2, the first conveyance line 85 carries the unloaded powerless battery pack (the first battery pack 3 or the second battery pack 4); the second conveyance line 88 carries the full power battery pack; the work range of the first conveyance line 85 and the second conveyance line are located at the first robot palletizer's work range; the first conveyance line 85 and the second conveyance line 88 may be arranged in parallel.

The delivery process of powerless battery packs: the ferry robot 25 carries the powerless battery pack and moves along the track of the rail 24 to the first work position 90 accurately with the help of the four column lifter 22, and then the first robot palletizer 86 takes the battery pack and put it down at the seventh work position 96. Then the powerless battery pack comes along the first conveyance line 85 to the fifth work position 94, and the robot uses a three-dimensional scanning identifier to scan the top of the battery pack (the scanning speed is more than 500 mm/s); By scanning the contour map of the detected objects, the 3D scan recognizer syntheses the three-dimensional image by multiple contour maps; through its 3D detection method, three-dimensional coordinates of the height and position of the first battery pack 3 or the second battery pack 4 and the angle between the coordinate axis are obtained, then the data is sent to the second robot palletizer 87 to locate battery pack. The control device PLC of the second robot palletizer 87 gives a trigger signal to the three-dimensional scanning identifier, so that the three-dimensional scan recognizer begins to scan, and the position coordinates of the battery pack is obtained after scanning. According to the position data of the first battery pack 3 or the second battery pack 4, the second robot palletizer 87 walks to the fifth work position 94 and grabs the first battery pack 3 or the second battery pack 4 at the sixth work position 95 to stacking, and the manual forklift take the stack of the first battery pack 3 or the second battery pack away.

The delivery process of full power battery packs: a whole stack of the first battery pack 3 or the second battery pack 4 is forked into the fourth work position 93, and the second robot palletizer 87 opens the first battery pack 3 or the second battery pack 4 into the third work position 92. The battery pack flows along the second conveying line 88 to the second work position 91, then the robot grasps it at the second work position 91 accurately; the ferry robot 25 walks along the rail 24 and enters the first work position 90, then the first robot palletizer 86 holds the battery pack at the second work position 91 and put it on the top of the ferry robot 25.

Step 1: the driver of the electric vehicle 498 clicks on the battery remote control swapping request key on the main display screen 162 of the electric vehicle 498, sending a battery swapping request to the remote monitoring center 417 through the 3G/4G network. After checking the nearest battery swapping station, the remote monitoring center 417 sends a voice or a short message to the electric vehicle 498. When the electric vehicle 498 arrives at the battery swapping station 419, the driver drives on the four column lifter 22 and clicks the remote battery swapping key on the main display screen 162 to start the battery pack swapping mode under the control of the remote control center 417.

Step 2: the remote monitoring center 417 starts the battery swapping system 398 on the chassis of the electric vehicle, and the ferry robot 25 walks along the rail 24 to the first battery pack installation position 32 below the battery pack automatic swapping system 5 of the electric vehicle 498. The battery pack tray 44 holds against the first battery pack 3, and the operator of the remote control center 417 remotely starts the first battery pack unloading program on the main display 162 of the electric vehicle 498. And the first battery pack robot system 361 starts to work, then the first bracket 323 installed at the lower end of the connecting rod 368 moves away from the first battery pack 3 along with the connecting rod 368 under the drive of the power device. Then the first bearing platform 328 on the first bracket 323 is gradually separated from the second fixing platform 329 of the first battery pack 3, and the first battery pack is separated from the first bracket 323. The ferry robot 25 starts to work to drive the first battery pack 3 to move away from the first load bearing platform 328 and controls the first battery pack robot system 361 to stop working. The ferry robot 25 carries the first battery pack 3 along the rail 24 to the first work position 90. Then the first robot palletizer 86 grabs the first battery pack 3 on the top of the battery tray 44, which is on the top of the ferry robot 25 at the first work position 90, and puts it on the seventh work position 96.

Step 3: the first robot palletizer 86 grabs the charged first battery pack 3 and puts it on the top battery tray 44 of the ferry robot 25.

Step 4: The ferry robot 25 walks along the rail 24 to the four column lifter 22. and after the ferry robot 25 completes the X/Y direction, the process of the rise of the robot uses the output of the ultrasonic distance measuring sensor and the output difference between the encoder of the hydraulic mechanism, and as the input of the PID controller, the proportional flow valve is controlled by PID. The hydraulic mechanism is lifted to the desired position to stop rising and position accurately. The instruction of the first battery pack 3 is issued by the remote monitoring center 417 to the ferry robot 25, the ferry robot 25 sets the first battery pack installation position 332 on the first battery package 3 to the battery package automatic replacement system 5, and the remote monitoring center 417 operator starts the first battery package robot system 361 to start working and pushes it to work. The first battery pack 3 moves so that the first battery pack first fixed platform 333 is gradually entered into the first load-bearing table 343 of the battery bracket, the first electrical appliance plug 321 is in close contact with the first battery pack connector 322, and the first battery pack 3 is installed, and the first battery pack robot system 361 stops working, and the ferry robot 25 is along the rail 2. 4 leave the four column lifter 22.

Step 5: The Ferry Robot 25 walks along the rail 24 to the four-column lift 22 to reach the second battery pack installation position 341 below the electric vehicle chassis 2, the battery pack tray 44 holds the second battery pack 4, and the operator of the remote monitoring center 417 remotely starts the unloading of the second battery pack program on the main display 162 of the electric vehicle 498 to control the second battery pack robot 363 to start working. The second bracket 316 installed at the lower end of the connecting rod 368 moves away from the second battery pack 4 along with the connecting rod 368. The second loading platform 324 on the second bracket 316 gradually separates from the second fixed platform 399 of the second battery pack 4, and the second bracket 316 is detached from the second battery pack 4 to control the second battery pack robot 363 to stop working. The second battery pack 4 landed on top of the battery pack tray 44 of the ferry robot 25, and the ferry robot 25 carried the second battery pack 4 along the rail 24 to the first work station 90. The first palletizing robot 86 grabbed the second battery pack 4 from the top of the battery pack tray 44 of the ferry robot 25 at the work station 90 to the seventh station 96.

Step 6: the first palletizing robot 86 grabs the charged second battery pack 4 and puts it on the top of the battery tray 44 of the waiting ferry robot 25.

Step 7: The ferry robot 25 travels along the walking track 24 of the ferry robot to the four-column lifter 22. After the ferry robot 25 completes the X/Y direction positioning, the robot rises in the process of using the output of ultrasonic distance sensor and the output difference of hydraulic encoder to calculate as the input of PID controller to control PID of the proportional flow valve. When the hydraulic is lifted to the expected position, it is stopped in accurate position. The remote monitoring center sends the order of installing the second battery pack 4 to the ferry robot 25, and the ferry robot 25 holds the second battery pack 4 to reach the installation position 341 of the second battery pack under the chassis 2 of the electric vehicle 498. The battery pack tray 44 holds the second battery pack 4 to the installation position 341 of the second battery pack, and the operator of the remote monitoring center 417 starts to control the second battery pack robot system 363 to start work. The first battery pack 3 is pushed to move so that he first fixing platform 342 of the second battery pack 4 gradually enters the second load-bearing platform 335 of the battery support. The second plug 336 and the second battery pack socket 337 are closely contacted, the second battery pack 4 is installed, controlling the second battery pack robot system 363 to stop working. The remote monitoring center 417 sends the instruction of finishing installation of the second battery pack 4 to the ferry robot 25, and the ferry Robot 25 leaves the four-column lifter 22 along the track 24.

Step 8: When the battery replacement process is over, the four-column lift 22 drops, and the driver drives the electric vehicle 498 away from the electric vehicle battery swapping station.

Step 9: the remote monitoring center 417 sends the signal of finishing battery swapping to complete the original reset of the electric vehicle battery swapping station.

What is claimed is:

1. A remote energy monitoring and swapping network system for electric vehicle based on cloud computing network architecture, the system comprising:
    a remote control center,
    an electric vehicle remote monitoring system,
    a battery remote monitoring system,
    a battery swapping system on the chassis of the electric vehicle;
    a battery swapping system, configured to integrate large data with cloud computing network, Internet of Things technology, video recognition technology and multi-type monitoring system;
    a front-end data acquisition and control subsystem, which comprises a front-end controller, a front-end data processor and a memory, a monitoring host, monitoring extensions and monitoring terminals distributed in the monitoring sites;
    wherein the front-end controller, the front-end data processor and the memory coordinate the monitoring host, the monitoring extensions and the monitoring terminals after receiving the control commands to complete data acquisition, processing, storage and timely data upload;
    the monitoring extensions have 16 channel data interfaces and control interfaces, and complete the collection and return control signals of 16 channel data to adjust equipment;
    each standard measurement and control interface provides three types of standard bus: a power line, a ground line, a data line;
    each of the monitoring terminals adopts panoramic high-point intelligent monitoring, which adopts panoramic camera and tracking camera connection mode; while realizing macroscopic large-scale scene monitoring, the system has the ability to continuously track and capture detailed information of a plurality of targets within the monitoring range, and has the ability to capture and save characteristic pictures;
    the alert area has the ability to be self-defined by the system, and the number of moving targets entering and leaving the alert area is counted;
    at the same time, objects passing through the alert area are alerted in real time;
    a camera is installed in the access area of the battery swapping station;
    the video camera takes pictures of the electric vehicles, and the pictures are saved as 24-bit true color images in JPEG compression format;
    the images are saved in a cyclic overlay mode, and images of license plate numbers are automatically spotted by the system;
    the information of all vehicles, including the image path, is stored in the database;
    the monitoring terminals are installed at the following locations in battery swapping stations: a first palletizing robot, a second palletizing robot, a ferry robot, a four-column lifter, a rail, a first conveyor line and a second conveyor line;
    a data transmission network subsystem is an integrated system composed of wired network, wireless network, 3G and 4G mobile Internet, broadband Internet, and it adopts the Protobuf specification to define the format and standard of data and instructions exchanged between all equipment and management platform of the electric vehicle battery swapping stations;
    the data transmission between the 3G module and the management platform is encapsulated into UDP and TCP packets according to the upper service protocol, and data parity check and message loss re-transmission mechanism are used to ensure the reliability of the data communication;
    especially in the communication process between all the equipment of the electric vehicle battery swapping station and management platform, the transmission algorithm based on the TCP protocol is used;
    a backstage management subsystem comprises a database, a cloud server, a cloud host to provide cloud management and cloud storage services;
    the data collected by various terminals are automatically analyzed and automatically sent to regulate field control devices according to the results of the analysis;
    the backstage management subsystem provides customers access to the service for cross platform users responding to the monitoring requirements of the authorized users in time, and feedback the data and processing results of the power station to the user terminal;
    the background management subsystem also has video analysis function, automatically analyzing the video data in real time;
    under the condition that abnormal behaviors are found, pre-alarm and alarm signals are sent to the user in time through the client application subsystem by the backstage management subsystem; and
    a client application subsystem comprises a remote monitoring center, an electric vehicle remote control receiving signal system, a computer terminal and an application software, providing integrated service functions including real-time and timing monitoring, recording query, data analysis, data printing, video display and playback.

2. A remote energy monitoring and swapping network for electric vehicle based on cloud computing network, the network comprising:
    a front-end data acquisition and control subsystem, which comprises a front-end controller, a front-end data processor and a memory, a monitoring host, monitoring extensions and monitoring terminals distributed in the monitoring sites;
    the front-end controller, the front-end data processor and the memory coordinate the monitoring host, the monitoring extensions and the monitoring terminals after receiving the control commands to complete data acquisition, processing, storage and timely data upload;
    the monitoring extensions have 16 channel data interfaces and control interfaces, and complete the collection and return control signals of 16 channel data to adjust equipment;
    each standard measurement and control interface provides three types of standard bus: a power line, a ground line, a data line;

each of the monitoring terminals adopts panoramic high-point intelligent monitoring, which adopts panoramic camera and tracking camera connection mode; while realizing macroscopic large-scale scene monitoring, the system has the ability to continuously track and capture detailed information of a plurality of targets within the monitoring range, and has the ability to capture and save characteristic pictures;

the alert area has the ability to be self-defined by the system, and the number of moving targets entering and leaving the alert area is counted;

at the same time, objects passing through the alert area are alerted in real time; a camera is installed in the access area of the battery swapping station;

the video camera takes pictures of the electric vehicles, and the pictures are saved as 24-bit true color images in JPEG compression format;

the images are saved in a cyclic overlay mode, and images of license plate numbers are automatically spotted by the system;

the information of all vehicles, including the image path, is stored in the database;

the monitoring terminals are installed at the following locations in battery swapping stations: a first palletizing robot, a second palletizing robot, a ferry robot, a four-column lifter, a rail, a first conveyor line and a second conveyor line;

a data transmission network subsystem is an integrated system composed of wired network, wireless network, 3G and 4G mobile Internet, broadband Internet, and it adopts the Protobuf specification to define the format and standard of data and instructions exchanged between all equipment and management platform of the electric vehicle battery swapping stations;

the data transmission between the 3G module and the management platform is encapsulated into UDP and TCP packets according to the upper service protocol, and data parity check and message loss re-transmission mechanism are used to ensure the reliability of the data communication;

especially in the communication process between all the equipment of the electric vehicle battery swapping station and management platform, the transmission algorithm based on the TCP protocol is used;

a backstage management subsystem comprises a database, a cloud server, a cloud host to provide cloud management and cloud storage services;

the data collected by various terminals are automatically analyzed and automatically sent to regulate field control devices according to the results of the analysis;

the backstage management subsystem provides customers access to the service for cross platform users responding to the monitoring requirements of the authorized users in time, and feedback the data and processing results of the power station to the user terminal;

the background management subsystem also has video analysis function, automatically analyzing the video data in real time;

under the condition that abnormal behaviors are found, pre-alarm and alarm signals are sent to the user in time through the client application subsystem by the backstage management subsystem;

a client application subsystem comprises a remote monitoring center, an electric vehicle remote control receiving signal system, a computer terminal and an application software, providing integrated service functions including real-time and timing monitoring, recording query, data analysis, data printing, video display and playback.

3. The remote energy monitoring and swapping network system for electric vehicle based on cloud computing network architecture according to claim 1, the network comprising:

a remote monitoring center comprises a liquid crystal display (LCD), a display control host, a network switch, a graphics splicing controller, a graphics workstation, a control host of the graphics workstation group, a server group and a terminal group;

the LCD and the display control host are electrically connected, the display control host has a display control module that controls the display of the LCD's display content and display area, and the LCD and the display control host are connected to the graphics splicing controller respectively;

the graphics splicing controller is connected to the graphic processing station, and the graphics splicing controller has the concatenation and stitching module in which the graphics and video and audio are collected from the graphics workstation, completing the combination and splicing modules;

the network switch is connected to the terminals of the graphics workstation, the graphics splicing controller, the control host of the graphics workstation group and the server correspondingly; the control host of the graphics workstation group is connected with the terminals of the graphic workstation and the server respectively;

the control host of the graphics workstation group comprises the graphics control modules to control graphics, video and audio in the graphics workstation;

the graphic workstation control host also has a graphics collection module that collects graphics, video and audio from the server and terminals, and the graphics collection module is also connected to camera;

the server group comprises handling the voice and data information in the terminal group, and the server group comprises the main server and the second level server, the terminal group comprises data terminals and voice terminals;

a remote monitoring center comprises a plurality of seats, each seat runs the same software, and the terminal group comprises:

1. battery swapping monitoring seats, which monitor and control the progress of battery swapping by displaying software and scheduling software;

22. battery planning seats, which are mainly for the power station command system to deal with the relevant battery needs information, publish battery supply plan and assist in coordinating battery supply status;

3. battery transportation management seat, which distributes batteries and dispatches battery transport vehicles through software, so that batteries is transported to all power stations according to previous plans;

4. an emergency rescue command seat, which provides three dimensional grid of resources allocation map to a commander to provide the distribution of vehicle resources distribution data, and the commander coordinates the relevant departments and units to dispatch the vehicles to be dispatched according to the distribution data;

5. an operator seat in the swapping station, which provides a main specific operation for the battery swapping process;

a battery (full power) supply plan editor configured to make battery supply plan;

a battery distribution software distributes batteries for each swapping station in the Gantt chart and displays the battery occupancy of each swapping station graphically;

an automatic processing software module (a software module) of electric vehicle's power loss alarm configured to receive and process alarm information of electric vehicle's power loss and update battery state;

a telephone software is software module, which is used for telephone coordination of the whole system;

the battery (full power) resource allocation display software is software module, which presents the resource allocation of the battery (full electricity) in a grid way and provides resources and scheme information in special situations;

a data server software module configured to distribute and process the relevant data in the system, and also has the data management function of all the software in the system;

a seat in the terminal group has the ability to publish control instructions according to the corresponding authority and work requirements of the seat;

the control instruction data comprises graphics, telephone audio and others to transmit to the network switch;

a network switch transfers control instruction data to a main server and a second level server;

after the logic processing of the main server and the second level server, the processed data is transferred to the graphics splicing controller;

the graphics splicing controller intelligently realizes the splicing and combination of various data, and finally displays data in the LCD;

a PDA controller releases control instructions, for instance jurisdiction and work requirements of the seat;

control instruction data comprises graphics, telephone audio and other instructions, which are transmitted to the network switch;

on the, data information of various terminals and cameras is to be displayed in the LCD in time, which is convenient for the terminal user to watch and get the information data of the swapping station to coordinate operations properly;

a remote monitoring center comprises a data terminal, a voice terminal, a graphics workstation, a PDA controllers, and the display control module of the large screen display control host has sixteen kinds of display control modes, and the selection and switching of the display modes of the large screen LCD display is to be realized by the graphics splicing controller; the remote monitoring center comprises a large screen LCD, a large screen display control host, a network switch, a graphics splicing controller, a graphics workstation, a graphics workstation group control host, a server group and a terminal group; the network switch is connected with the graphics workstation, the graphics splicing controller, the graphics workstation group control host, the graphics workstation group server and the graphics workstation group terminal respectively; the LCD screen configured to display graphic, video and audio data after mosaic; the graphics splicing controller configured to extract graphics, video and audio from graphic workstations and perform combination and stitching; the graphics workstation group controls the storage, movement, display and deletion of graphics, video and audio in graphic workstation; the network switch is connected with graphics workstation and graphics splicing controller, graphics workstation group control host, the server and the terminals; the server includes the main server and the second level server; the terminal comprises the data terminal and the voice terminal, the main server configured to receive and control data information of the data terminal; the second level server configured to receive and control the voice information of the voice terminal; the large screen display control host is connected to wireless receiver and the receiver is connected to the PDA controller by wireless communication; the data instruction information sent by the data terminal is transmitted to the main server through the network switch; after logical operation of the main server, the data information and processing results are displayed through the LCD display screen and the LCD of the data terminal; the speech instruction message sent by the voice terminal is transmitted to the second level server through the network switch, and the logic operation is processed through the second level server; the voice information and the processing results are displayed through the LCD display screen and the LCD screen of the voice terminal; the data and voice instructions sent by the PDA controller is transmitted to the wireless receiver through wireless communication; the wireless receiver sends the data and voice information through the large screen display control host to the graphics splicing controller. Through the logical operation of the main server and the second level server, the data, voice information and processing results are displayed through the LCD and the large screen of PDA controller. The graphic workstation group controls the host, and the data information is transmitted to the main server through the network switch, and after the logical operation is processed through the main server, the data and processing results are displayed through the LCD;

a computer is in the operator seat of swapping station, and a monitoring center is in the operator seat of swapping station; the monitoring center is connected with a battery supply plan editor, a battery distribution software module, an electric car battery alarm automatic processing software module, a telephone software module, a battery planning and dispatching software module, a battery resources distribution display software module and a data server software module;

a remote monitoring center comprises a plurality of seats: a battery swapping control seat, a battery planning seat, a battery transportation management seat;

an emergency rescue command seat and an operator seat comprise the following components: a support rod is in an integrated arc structure, which is built from the back of the seat, extending to the front seat, the top of a support rod is a lateral part, the lateral part tends horizontally; a visual perception unit is connected with the lateral part elastically, which means the visual perception unit has the ability to achieve expansion adjustment;

a support bar is connected with a support base through hinges and reaming shaft, so that the tilt angle of the support rod is to be adjusted;

a converter operator adjusts the support rod forward and backward in accordance with needs; a first rail, a second rail, and a third rail are also designed in the support base;

a supporting point between an auxiliary unit and the support base falls on the first rail, making an operational auxiliary unit moves along the first rail; and the support point between another seat and the support base falls on the third rail, so that the seat moves along the third rail.

4. The remote energy monitoring and swapping network system for electric vehicle based on cloud computing network architecture according to claim 1, the network comprising:

an electric vehicle comprises a main display device, which is shown as part of a central console that the user may access on the driver seat and the front passenger seat; the main display device shows visual information and user interface device when the main display device receives user's input in the electric vehicle; when the electric vehicle enters the communication range of the remote control system, a communication connection with the remote system is established to choose one or more options for interacting with the remote system and shows one or more icons on a touch sensitive master display; and selecting the icon showed initiates one or more options for interacting with the remote control system;

a remote control system comprises remotely controlling battery swapping, unloading a first battery pack and a second battery pack, installing the first battery pack and the second battery pack, monitoring the electric vehicle and the battery packs, showing the temperature of the battery packs;

a system is to be controlled and reconfigured to appear in the main display; the control system comprises a user interface device, a communication interface and a processing circuit; the processing circuit comprises a processor and a memory, and the user interface device comprises a master display; the main display configured to show applications and provide detailed information and options for interacting with local systems and remote systems, and the main display is a touch sensitive display, which comprises a touch sensitive user input device that is capable of detecting the user input based on the touch; the main display comprises a plurality of knobs, buttons, tactile user input with a plurality of technologies, for instance, (LCD), plasma, thin film transistor (TFT), cathode ray tube (CRT), and the main display comprises an embedded display (for instance, a display embedded in the control system and other vehicle systems, parts and structures), an independent display (for instance, a portable display, a display mounted on a movable arm), and a display with any other configuration;

a system comprises a communication interface, and the communication interface comprises a system interface, a remote system interface and a mobile device interface; the system interface facilitates communication between the control system and every local vehicle system, for instance, the system interface allows the control system to communicate with the local vehicle system (including GPS navigation system, engine control system, transmission control system, HVAC system, battery monitoring system, timing system, speed control system, anti-lock braking system); the system interface has electronic communication with every parts of the electric vehicle, so the electric vehicle has the ability to receive input from a local vehicle sensor (for instance, speed sensors, battery temperature sensors, pressure sensors), as well as remote sensors and devices (for instance, GPS satellites, radio towers); the received input of the electric vehicle is to be transmitted through the system interface to the control system; the received input of the system interface configured to establish context of the electric vehicle by a context module, and the system interface provides wire communication connection using USB technology, IEEE1394 technology, optical technology, other serial port technologies, parallel port technologies, and some of its appropriate wired connections; the system interface comprises any number of parts configured to control and promote communication activities in the local vehicle system, for instance, hardware interfaces, transceivers, bus controllers, hardware controllers, and software controllers; the system interface comprises a local interconnected network, a controller area network, a MAY bus, a LIN bus, a Flex Ray bus, a media oriented system transmission, a key protocol 2000 bus, a serial bus, a serial bus, a parallel bus, a vehicle area network, a DC-BUS, a IDB-1394 bus, a SMART wire X bus, a MOST bus, a GA-NET bus, IE bus;

a system interface uses one or more wireless communication protocols to establish a wireless communication connection between the control system and the electric vehicle system and hardware components of the electric vehicle; the system interface supports communication via Bluetooth communication protocol, IEEE802.11 protocol, IEEE802.15 protocol, IEEE802.16 protocol, cellular signal, shared wireless access protocol-line access (SWAP-CA) protocol, wireless USB protocol, infrared protocol and some other appropriate wireless technology; the system is to be configured to route information between two or more electric vehicle systems via the system interface; the control system routes information between vehicle system and remote system via the system interface of the vehicle system and the system interface of the remote system; the control system routes information between vehicle system and mobile devices via the system interface and the interface of mobile devices;

a communication interface is shown to comprise a remote system interface; the remote system interface is convenient for communication between the control system and any number of remote systems via remote systems and the remote monitoring center; the remote system comprises system and device that interacts with the control system through the remote system interface outside the electric vehicle; the remote system comprises a radio tower, a GPS navigation, other satellite, a cellular communication tower, a wireless router (for instance, WIFI, IEEE802.11, IEEE802.15), a capable remote device, a remote computer system, a server with wireless data connections, and any other remote communication that communicates without wire via the remote system interface; the remote system exchanges data within itself through the remote system interface;

a control system is shown to comprise a processing circuit, and the processing circuit comprises a processor and a memory; the processor comprises a general purpose processor, a dedicated integrated circuit (ASIC), one or more field programmable gate arrays (FPGA), a CPU, a GPU, a set of processing components, and an appropriate electronic processing unit; the memory comprises one or more devices for storing and promoting the data and computer code of various processes, layers and modules described in the present disclosure (for instance, RAM, ROM, flash memory, hard disk memory); the memory comprises volatile memory and non-volatile memory; the memory comprises a database component, an object code part, a script part, and it is connected to the processor via a processing circuit for executing computer codes that have one and more processes described in this article;

a vehicle intelligent terminal of the electric vehicle collects the information of the electric vehicle in real time: the real-time state of the electric vehicle and the alarm information are transmitted through the network communication to the remote control center; the information collected from electric vehicles includes BMS, VCU, ammeter, alarm information; data network communication methods comprise wireless transmission, for instance, GPRS; the remote control center has the ability to obtain GPS information of the electric vehicle from the vehicle intelligent terminal, and matches a vehicle map service module, combining the GPS information sent from the vehicle intelligent terminal to obtain the real-time geographic location information of the running vehicle; with the location of the vehicle, the road condition of the vehicle, the surrounding environment, the distance from the destination and the battery station in the surrounding area are observed, so that the electric vehicle is to be selected for service according to the warning threshold analysis;

a remote control center obtains the information of the electric vehicle through the vehicle communication interaction module, and combines the configuration parameters and the alarm threshold of the electric vehicle for analyzing to send orders to the electric vehicle 4; the intelligent terminal of the electric vehicle transmits the data of the information of the electric vehicle directly to the remote control center, and carries out the information transmission in the following way: a front vehicle communication service module accepts the data of the basic information of the electric vehicle and saves the data in real time front library of a communication service front module; through the data monitoring tool of the front vehicle communication service module, the stored information is monitored in real time and the intelligent alarm information is generated according to the actual demand; the data migration service in the front vehicle communication service module sends the data of each electric vehicle to the data transfer service module, and then sends it to the remote control center; the remote control center accepts instructions from a superior vehicle operation monitoring system to control each electric vehicle separately;

a remote control center analyzes the information of the new electric vehicle when a new electric vehicle joins, and determines the operation of it through the instruction of the superior vehicle operation monitoring system, thus putting the new electric vehicle in the net; the remote control center also analyzes the alarm information, the superior vehicle operation monitoring system then sends different instructions to the new electric vehicle through analyzing the severity of the alarm information, and decide whether the new electric vehicle's needs to be met first to ensure its operation safety; using Ethernet, RS485, CAN, GPRS and other communication methods through the data forwarding service module, the data of the electric vehicle information is obtained from the remote control center, coordinating with a electric vehicle public service interactive platform;

a remote control center sets up a communication connection with the electric vehicle again, and transfers each instruction to the vehicle intelligent terminal of each electric vehicle through the network communication mode; then the user deals with the electric vehicle according to the instructions obtained by the vehicle intelligent terminal;

a vehicle device main controller comprises a main control module, a CAN bus communication module, a 3G/4G wireless communication module, a GPS data receiving processing module and a user interaction module; the CAN bus communication module is connected to the main control module through the SPI bus, the 3G/4G wireless communication module, the GPS data receiving processing module and the user interaction module are both two-way connected with the main control module through serial ports;

a remote monitoring system for the battery management system of electric vehicles comprises a plurality of battery groups, a battery management system, a data remote transmission terminal module, and a remote monitoring centers; a plurality of battery packs are used to supply power for electric vehicles; the battery management system is connected to a plurality of battery packs, and the battery management module configured to obtain the running state parameters of a plurality of battery pack; the operating parameters of the battery pack comprise single battery voltage, battery pack voltage, battery pack charge and discharge current and battery temperature; the operating state parameters of the battery pack are used to judge the thermoelectric state of the battery, and also are used as inputs for the comprehensive state analysis of the battery pack, for instance, the analysis of SOC and SOH;

a battery management system comprises a BMS master controller; a current collector module configured to collect the battery charge current and discharge current; a voltage collector module configured to collect the cell single voltage and the total battery voltage; a temperature measurement sub module configured to measure the battery temperature; a SOC estimation module configured to estimate the residual charge of the battery, ensure reasonable use of batteries, prevent battery's over-discharge and over-charge and prolong battery life; a display module is a touch screen for showing the running state parameters and operation conditions of the electric vehicle; a management sub module of charging and discharging manages charging and discharging process reasonably according to actual needs to guarantee safety; a data communication module configured to realize the data exchange and sharing of between the electric vehicle and other vehicle terminals, for instance, the remote transmission terminal on vehicle, the human-computer interaction interface; a battery balancing sub module configured to judge the voltage of the battery monomer to deal with situation automatically, for instance, the unbalanced state of the battery; the battery fault diagnosis module configured to remind the user of the fault location in time to avoid accidents and safety problems when the battery is overcharged and overplayed; the above sub modules are powered separately and interact with each other through the CAN bus inside the system; the BMS master controller in the battery management system is the main node of the system, and the BMS master controller communicates with each module through the internal CAN bus and gets the data of the battery running state parameters and other information; a remote data transmission terminal module uses GPRSDTU to realize two-way communication with the battery management system through the CAN bus; GPRSDTU is carried on the CAN network of the BMS as the remote transmission terminal of the vehicle data; the data remote transmission terminal module comprises a communication sub module, a GPRS sub module, an electronic module and a microprocessor; the communication sub module comprises a CAN interface and at least two serial ports; the communication sub module communicates with the battery management system through the CAN interface and receives the CAN message information uploaded by the battery management system; the communication sub module communicates with the GPRS sub module through the serial port and may reserves the RS232 interface, and the PC machine configures the GPRSDTU through the interface; the GPRS sub module uses GPRS communication mode to communicate with the remote monitoring center, and the communication protocol adopts the TCP/IP protocol; in this implementation example, the GPRS sub module selects the SIM900A chip to realize the GPRS function;

an interior comprises a memory, a GSM baseband, a GSM radio frequency, an antenna interface, a video interface, a power interface, a LCD interface, a UART interface, a SIM interface, and a GPIO interface (or key interface) outside; an electronic module is connected with the communication module, the GPRS sub module and the microprocessor respectively for supplying the communication sub module, the GPRS sub module and the microprocessor, and the electronic module is 24V power supply on vehicle; when the power supply is supplied, the 24V DC power supply needs to be converted to supply power; the microprocessor is the monitoring center of the whole data remote transmission terminal module, and the microprocessor has the ability to complete the configuration of the GPRS sub module and process the uploaded data of the battery management system in advance; the remote monitoring center and the data remote transmission terminal module carry out two-way communication through GPRS; the remote monitoring center is oriented to the user, obtaining the data of the battery management system in real time; ad the data is parsed and displayed to the user, and the analysis and playback function of the data is provided;

a remote monitoring center monitors and handles the emergency of the battery packs: when the electric vehicle is running, the remote monitoring center and the data remote transmission terminal module carry out two-way communication through the GPRS; the battery management system is connected with a plurality of battery groups, and the running state parameters of a plurality of battery groups are obtained in real time; the data remote transmission terminal module realizes two-way communication with the battery management system through the CAN bus, including the communication sub module, the GPRS sub module, the electronic module and the microprocessor; in real-time acquisition of battery management system data, data analysis and protocol analysis are showed to users to provide data analysis and playback function; under the condition that the first battery pack suddenly reaches the warning temperature, for instance, 150 degrees, the remote monitoring center immediately notifies the user to switch from the first battery package to the second battery pack by the battery swapping system on the chassis of the electric vehicle; and under the condition that the first battery pack exceeds the warning temperature and is still rising, a first battery pack robot system begins to work, and a first bracket installed in the lower end of the connecting rod is moved away from the first battery pack with the connecting rod after the remote monitoring center immediately notifies the user; then a first load-bearing platform on the first bracket is gradually separated from a second fixed platform of the first battery pack, and the first bracket is separated from the first battery pack; the first battery pack automatically falls off the electric vehicle chassis and falls onto the road surface finally; when a second battery pack suddenly reaches warning temperature, for instance, 150 degrees, switching the second battery pack to the first battery pack starts immediately; under the condition that the temperature of the second battery pack exceeds the warning temperature and is still rising, the remote monitoring center immediately notify the user to cooperate immediately to start a second battery pack robot system; and a second bracket installed at the lower end of the connecting rod is moved away from the second battery pack with the connecting rod under the driving force, and a second load-bearing platform on a second bracket is gradually separated from a second fixed platform; the second bracket is separated from the second battery pack, and the second battery pack automatically falls off the electric vehicle chassis and finally falls onto the road surface; under the condition that the first battery pack and the second battery pack simultaneously reach the warning temperature and is still rising without control, the remote monitoring center immediately notifies the user, starting the first battery package robot system to move the first battery package away and the second battery pack robot system to move the second battery package away to quickly drop the first battery pack and the second battery at the same time.

5. The remote energy monitoring and swapping network system for electric vehicle based on cloud computing network architecture according to claim 1, the system comprises:

a four column lifter with a vehicle running plate comprises a first column, a second column, a third column, a fourth column, a cantilever beam, a cross beam, a running plate and a inclined plate; an opening is arranged on the beam between the first column and the second column, so that the ferry robot enters the four column lifter, and a beam is set between the third column and the fourth column; the first column, the second columns, the third columns and the fourth column are installed on a mobile rack and move up and down along with the moving frame to raise a vehicle running board to the appropriate position; the inclined plate is connected with a running plate to facilitate the running board of the upper and lower fourth column lifter of the electric vehicle;

a lifter fixed frame is equipped with four or more symmetrical rolling wheels at the bottom, and each lifter column is composed of a fixed frame, a power unit, a hydraulic cylinder, a lifting chain, a detecting plate, a detecting switch, a movable frame, a sprocket seat, and a sprocket; in the pile column of the lifter fixed frame, a strip detecting plate is fixed with a plurality of equal gaps, and the bottom of the upper end of the mobile shelf is provided with a detecting switch, which is matched with the detecting plate; when the detecting plate is in the range of the detecting switch, the detecting switch outputs the signal; gaps are set on the detecting board; when the detecting switch detects a gap, the detecting switch does not output the signal; backwards and forwards, the signals generated by the detecting switch of the lift column's detecting switch are all connected to and calculated by the data line connection controller, and the data calculated by the controller is displayed through a line connection display panel at the same time; the upper end of a mobile frame is provided with a sprocket seat and a sprocket, and the sprocket supports the lifting chain; one end of the lifting chain is connected to the mobile frame, and the other end is connected to the fixed rack; one end of the hydraulic cylinder is connected with the base of the lifter fixing frame, and the other end is connected with the sprocket seat; when the hydraulic cylinder rises and falls, a sprocket wheel on the sprocket seat rolls together with the lifting chain, and the mobile frame rises and falls along to make the detecting plate and the detecting switch work and produce the electrical signals;

a palletizing robot grip is installed at the bottom of the wrist base of the palletizing robot through a grip connection flange; through controlling the cable, the operation control system connects and starts the drive motor of the rotating frame, a vertical arm drive motor, a grab drive motor and a transverse arm drive motor; according to the position of the palletizing object, the drive motor of the rotating frame starts the rotating frame to turn around 180 degrees, start the vertical arm drive motor and the cross arm drive motor to move the cross arm and a connecting rod through moving up and down of the palletizing jig under the wrist pedestal's drive with the help of three parallel four bar mechanism and the motion vice mechanism to grab the target object in the desired position; when a horizontal arm drive motor drives, it moves up and down through the balance block and a first connecting rod to drive a horizontal arm, and drives a third connecting rod to move up and down together; a balance block is installed in the horizontal arm drive motor reducer with the help of the balance block mounting bracket; a palletizing fixture at the bottom of the wrist base is connected to the front end of the horizontal arm, balancing the weight of the target objects so that the robot is balanced and safe in work; according to the position of the target object, the vertical arm drive motor drives the vertical arm and a second connecting rod to move forward and backward; at the same time, the horizontal arm and a third connecting rod are moved up and down in parallel; since the lower end of the vertical arm is connected with an accumulator balancer, the vertical arm moves forward and backward during the transmission process of the vertical arm driving motor; when the horizontal arm moves up and down to grab objects, a energy storage balancer has a set of energy storage springs to balance the cushioning effect to make the work stable and safe in the process of stacking and hoisting; the palletizing robot realizes fast palletizing battery packs; the load capacity of the palletizing robot is more than 500 kilogram and the cycling capacity is more than 800 times per hour; a rotary machine seat is installed on the upper part of a base, and the drive motor of a rotary frame is installed on the rotary machine seat; the drive motor of the rotary frame rotates on the upper part of the base with the help of the a transmission gear and the reducer's rotary machine seat; the lower end connecting fork of the vertical arm is installed on a rotary machine base with bearing and connecting shaft on the two sides of the vertical arm; the drive motor of the cross arm is installed on one side of the rotary machine seat of the vertical arm through a reducer, and the balance block is connected through a balance block mounting bracket to the cross arm drive motor reducer; the lower end of the connecting rod is connected with a balance block support through bearing and connecting shaft; the upper end of the connecting rod is connected to the rear end of a transverse arm through bearing and connecting shaft; the rear part of a transverse arm is connected to the upper end of the vertical arm by bearing and connecting shaft; the front arm of the transverse arm is connected to the wrist base by bearing and connecting shaft; the grip's drive motor is installed on the wrist base, and the lower part of a gripper drive motor is connected with the gripper's drive motor reducer; the gripper's connection flange is connected with the gripper's drive motor reducer; the vertical arm drive motor is mounted (at the other side of the vertical arm) on the rotary machine seat through the vertical arm drive motor's decelerator; the energy storage balancer is mounted on (on the other side of the vertical arm) on the rotary machine seat through bearing and connecting shaft; the energy storage balancer is set with a spring, a expansion shaft and the front end of a telescopic shaft, and the front end of a telescopic shaft is connected to the connecting fork of the vertical arm's lower end through bearing and connecting shaft; the upper end of a second connecting rod is connected to the rotary machine seat through bearing and connecting shaft, the bottom end of the second connecting rod is connected to one end of the connecting rod support through bearing and connecting shaft; the other end of the connecting rod bracket is connected to a third connecting rod through bearing and connecting shaft, and the third connecting rod is movably connected to the wrist base through bearing and connecting shaft; the lower end part of the connecting rod bracket is movably connected to the upper end part of the vertical arm through bearing and connecting shaft; the connecting rod bracket is triangular, and three movable connecting bearing holes are arranged to form a three motion auxiliary mechanism; a first parallel four rod mechanism comprises a vertical arm, a first connecting rod, a balance block and a rear arm constitute; a second parallel four rod mechanism comprises a transverse arm, a third connecting rod, a wrist base and a connecting rod support; a third parallel four rod mechanism comprises a second connecting rod, a vertical arm, a connecting rod support and a rotary machine seat; a balance chain comprises the first parallel four rod mechanism, the second parallel four rod mechanism, the third parallel four rod mechanism and the three motion subsidiary mechanism; the palletizing robot is equipped with an operation control system, the operation control system uses a programmable controller for programming control; the palletizing robot is used for the first palletizing robot and the second palletizing robot;

a ferry robot comprises three degrees of freedom, a straight line walking mechanism (the X axis), a hydraulic lifting mechanism (the Z axis), and the angle correction mechanism (the R axis); the linear walking mechanism is arranged at the bottom of the ferry robot, and the linear walking mechanism comprises a pulley, an universal coupling, a belt, a first servo motor, a first reducer and a base, the front two pulleys are robot power devices connected with a group of universal coupling, and the two pulleys on the back end are driven devices; the first servo motor is connected with the expanding sleeve of the first speed reducer, and the power transmission of the first speed reducer and the pulley is realized through a belt, and the driving pulley is straight on the slide rail; the end of the linear walking mechanism is arranged with three photoelectric switches, the three photoelectric switches are matched with the original point baffler and the front and back two limit gears successively, providing a PLC control system with signals of the switch to realize the robot's origin search and reset and stop cross boundary operation; a front limit baffler, an original baffler and a back limit baffler are arranged sequentially along the lines, and the origin stop is arranged between a front limiting gear and a back limiting gear; the hydraulic lifting mechanism is arranged in the upper part of the base of the linear walking mechanism, and the hydraulic lifting mechanism comprises two hydraulic telescopic cylinders; the first level hydraulic cylinder is arranged at the lower part of the second level hydraulic cylinder, and the second level cylinder carries out the expansion movement after the first hydraulic cylinder is fully extended; the first and the second level hydraulic cylinder have welded crossbeam on one side separately and are arranged with a anti-rotating beam; the anti-rotating beam cooperate with two anti-rotating holes on the welded crossbeam of the first level hydraulic cylinder and the welded crossbeam on the base to prevent the rotation of the battery packs along with the lifting process of the hydraulic mechanism, the other sides of the first and the second level hydraulic cylinder comprises a rack, an encoder, a baffler and a first proximity switch respectively; the baffler cooperates with the proximity switch, and the first proximity switch is set at the bottom end of the welded cross beam of the first hydraulic cylinder; when the first level hydraulic cylinder completely extends, the baffler triggers the switch signal of approaching the switch, and the second hydraulic cylinder starts telescopic movement; a rack on the side of the second hydraulic cylinder is meshed with the encoder through a gear; after calculating revolutions of the encoder, the raising height of the second hydraulic cylinder is got, the encoder is connected with the PLC control system, and then the PLC control system begins to count at high speed; an angle correction mechanism is arranged at the upper end of the hydraulic lifting mechanism, and the angle correction mechanism comprises a fixing flange, large and small gear, a second servo motor and a second speed reducer; the fixing flange comprises a second level hydraulic cylinder, a second servo motor, a second reducer, the large and small gear are installed on the fixing flange in order; the small gear is mounted on the top of the second servo motor, the large gear is installed on the second level hydraulic cylinder, and the large and small gear go on mechanical meshing, rotating under the second servo motor's drive; the lower end of the large gear is arranged with a block, and three second proximity switches are arranged on the fixing flange; the large gear triggers signals of the rotating left and right limit and the signal of the original reset switch in order during the rotation process to ensure that the large gear rotates in the specified range; the upper end of the angle correction mechanism comprises a battery pack tray, and the revolving center of the big gear is concentric with the gravity center of the battery pack tray; the battery pack tray is equipped with four limit blocks coupled with four protrusions at the bottom of the battery pack box of the electric car to be changed to realize adjustment and reliable fixation of the battery box; the battery pack tray comprises an ultrasonic distance measuring sensor and a DMP sensor; an ultrasonic distance measuring sensor configured to measure the distance between the battery pack tray and the chassis of the vehicle; a DMP sensor cooperates with a reflector plate mounted on the chassis of the vehicle to search for the location of the counter plate target position and get the horizontal angle deviation of the ferry robot and the vehicle; the linear walking mechanism and the hydraulic lifting mechanism are in connection; only when the linear travel and the vertical lifting of the ferry robot reach the set position, the angle correction mechanism starts to move; only the battery pack tray of the angle correction mechanism reaches the expected effect, and the hydraulic lifting mechanism starts to restart; the linear walking mechanism and the angle correction mechanism are driven by the servo motor connected with the corresponding encoder, and each encoder is connected with a corresponding driver; the driver sends the position pulse signal to the servo motor, and the encoder sends the motor's rotation information to the driver to form full closed loop control of the position mode;

a PLC control system in the control system diagram of the ferry robot is the core of the movement control of the ferry robot, the PLC control system comprises a touch screen, a wireless communication module, an OMRON PLC controller, an ND module, a D/A module; the wireless communication module communicates with the touch screen through the second port RS130, the OMRON PLC controller communicates with the touch screen through the first serial port RS126, and the touch screen communicates with the background monitoring system through industrial Ethernet; an ultrasonic ranging sensor, a DMP sensor, a hydraulic proportional flow valve, each encoder, a proximity switch, a photoelectric switch and other devices have real time data transmission communication with the PLC control system; the ultrasonic distance measuring sensor and the DMP sensor are connected with the ND module in the PLC control system to convert analog signals collected by the sensor into digital signals and transmit it to the PLC control system; the hydraulic proportional flow valve is connected with the D/A module in the PLC control system, and transforms the digital control signal of the PLC control system into analog flow control information to realize the speed control of the hydraulic lifting mechanism; the encoder is connected with the ND module of the PLC control system, and the encoder collects the single rack's rising height of the second level hydraulic cylinder and obtains the lifting distance of the second level hydraulic cylinder through calculation; then the data is fed back to the PLC control system to form the full closed loop control during the lifting process; the proximity switch and the photoelectric switch are connected with the OMRON PLC controller in the PLC control system to transmit the limit position information of the ferry robot in real time and trigger the interruption mode and the high-speed counting mode of the PLC control system to realize the accurate and rapid action of the ferry robot in the specified range;

a battery swapping system on the electric vehicle's chassis comprises a first battery pack robot control system and a second battery pack robot control system, including a master controller, a hydraulic controller and a servo motor controller; the hydraulic controller and the servo motor controller are all connected with the master controller; the hydraulic controller is connected with a multiplex channel decompression amplifier, the multichannel decompression amplifier is connected with an electro-hydraulic proportional valve, and the electro-hydraulic proportional valve is connected to an oil cylinder connected to the mechanical hand rod to move up and down; the servo motor controller is connected with the a plurality of servo amplifier, and a multiplex servo amplifier is connected to the servo motor connected to the connecting rod, the servo motor is connected to a connecting rod through a reducer; the hydraulic controller is also connected with a displacement sensor for detecting the moving distance of the connecting rod and the pressure sensor for detecting the hydraulic pressure in a cylinder, and the servo motor controller is also used to detect the photoelectric encoder of the reducer; a general controller also comprises a video camera for recording the motion condition of the video and a display screen for displaying the motion condition; the hydraulic controller and the servo motor controller communicate with the master controller through the CAN bus; the master controller receives the instruction from remote control terminals through the RS232 data line, and controls the executions of each manipulator by the hydraulic controller and the servo motor controller under the CAN bus's assignment task; the output end of the hydraulic controller connects the multichannel decompression amplifier, and the oil cylinder is controlled by the electro-hydraulic proportional valve; the output end of the servo motor controller is connected to the multiplex servo amplifier, the output end of the multiplex servo amplifier is connected to the servo motor, and controls the reducer through the servo motor; the environment is collected through the camera, and the operation process of the manipulator is displayed through the display; the displacement sensor is set on the manipulator of the robot to avoid collision between self and external environment;

a battery swapping system comprises a first monitoring station, a second monitoring station, a third monitoring station, a first palletizing robot, a second palletizing robot, a ferry robot, a four column lifter, a rail, a first conveyance line and a second conveyance line (all are connected through local industrial Ethernet connection, wire network and wireless network); the intelligent communication terminal comprises a scheduling software, and the scheduling software and the intelligent communication terminal are connected through the digital communication connection; the battery swapping system also comprises a server, a printer, a communication management machine of the distribution system and an electrical information acquisition terminal (all connected to the network switch of the battery swapping monitoring system through the local industrial Ethernet): a network switch is connected to the communication gateway of the superior system by the local industrial Ethernet; the intelligent communication terminal of the battery swapping monitoring system is connected to the network switch through the local industrial Ethernet; the intelligent communication terminal and the battery swapping system are connected by the CAN bus; the PLC (Programmable Logic Controller) of the above equipment control the whole swapping process of the first battery pack and the second battery pack, the fault signal, the motor module working state, the temperature, the electric voltage, the current, the battery temperature, SOC, the end power and battery's connection state are uploaded to the dispatching software through intelligent communication terminal; each step of swapping the battery is controlled, commanded and guided by the monitoring center computer; the video server of the video surveillance system is connected with the communication gateway of the superior system through the local industrial Ethernet; a data server stores the historical data of the monitoring system, and a front server collects and parses the relevant real-time data and sends it to other computers; a security monitoring workstation configured to monitor and control the video surveillance system; the communication gateway realizes the conversion between CAN bus and local industrial Ethernet; there are 24 ports in the network switch, providing virtual LAN to realize communication between subsystems; the first monitoring station, the second monitoring station and the third monitoring station are emergency backup systems when any fault of the remote monitoring center is found;

a first conveyance line carries the unloaded powerless battery pack (the first battery pack or the second battery pack); a second conveyance line carries the full power battery pack; the work range of the first conveyance line and the second conveyance line are arranged at the first palletizing robot's work range; the first conveyance line and the second conveyance line is to be arranged in parallel;

a delivery process of the powerless battery packs: a ferry robot carries the powerless battery pack and moves along the track of the rail to a first work position accurately with the help of the four column lifter, and then the first palletizing robot takes the battery pack and put it down at a seventh work position; then the powerless battery pack comes along the first conveyance line to the fifth work position, and the robot uses a three-dimensional scanning identifier to scan the top of the battery pack (the scanning speed is more than 500 mm/s); a 3D scan recognizer syntheses the three-dimensional image by a plurality of contour maps through scanning the contour map of the detected objects; through the 3D detection method, three-dimensional coordinates of the height and position of the first battery pack and the second battery pack and the angle between the coordinate axis are obtained, then the data is sent to the second palletizing robot to locate battery pack; the control device PLC of the second palletizing robot gives a trigger signal to the three-dimensional scanning identifier, so that the three-dimensional scan recognizer begins to scan, and the position coordinates of the battery pack is obtained after scanning; according to the position data of the first battery pack or the second battery pack, the second palletizing robot walks to a fifth work position and grabs the first battery pack or the second battery pack at a sixth work position to stacking, and a manual forklift take the stack of the first battery pack or the second battery pack away;

a delivery process of full power battery packs: a whole stack of the first battery pack or the second battery pack is forked into a fourth work position, and the second palletizing robot opens the first battery pack or the second battery pack into a third work position; the battery pack flows along the second conveying line to a second work position, then the robot grasps the battery pack at a second work position accurately; the ferry robot walks along the rail and enters the first work position, then the first palletizing robot holds the battery pack at the second work position and put it on the top of the ferry robot;

step 1: the driver of the electric vehicle clicking on the battery remote control swapping-request key on the main display screen of the electric vehicle, sending a battery swapping request to the remote monitoring center through the 3G/4G network; after checking the nearest battery swapping station, the remote monitoring center 417 sending a voice and a short message to the electric vehicle; when the electric vehicle arrives at the battery swapping station, the driver driving on the four column lifter and clicking the remote battery swapping key on the main display screen to start the battery pack swapping mode under the control of the remote control center;

step 2: the remote monitoring center starting the battery swapping system on the chassis of the electric vehicle, and the ferry robot walking along the rail to a first battery pack installation position below the battery pack automatic swapping system of the electric vehicle; the battery pack tray holding against the first battery pack, and the operator of the remote control center remotely starting the first battery pack unload program on the main display of the electric vehicle; the first battery pack robot system starting to work, then the first bracket installed at the lower end of the connecting rod is moving away from the first battery pack along with the connecting rod under the drive of the power device; then the first bearing platform on the first bracket gradually is separating from the second fixing platform of the first battery pack, and the first battery pack is separating from the first bracket; the ferry robot driving the first battery pack to move away from the first load bearing platform and controlling the first battery pack robot system to stop working; the ferry robot carrying the first battery pack along the rail to the first work position; then the first palletizing robot grabbing the first battery pack on the top of the battery tray (the battery tray is on the top of the ferry robot at the first work position), and putting it on the seventh work position;

step 3: the first palletizing robot grabbing the charged first battery pack and putting it on the top battery tray of the ferry robot;

step 4: the ferry robot walking along the rail to the four column lifter and completing the X/Y direction, using the output difference between the output of the ultrasonic distance measuring sensor and the output of the encoder of the hydraulic mechanism as the input of the PID controller, controlling the PID of the proportional flow valve in the process of the robot's movement; when the hydraulic mechanism is lifting to the desired position, movement is suspending in the accurate position; the remote monitoring center sending the instruction of installing the first battery pack to the ferry robot, and the ferry robot putting the first battery pack on the first battery package installation position of the battery package automatic replacement system, and the operator of the remote monitoring center starting the first battery package robot system to start working and pushing the first battery pack to move, making the first battery pack's first fixed platform gradually going into the first load-bearing table of the battery bracket; connecting the first electrical appliance plug with the first battery pack connector closely, then the ferry robot leaving the four column lifter along the rail after completing the installation of the first battery pack;

step 5: the ferry robot walking along the rail to the four-column lift to get to a second battery pack installation position below the electric vehicle chassis, and the battery pack tray holding the second battery pack; the operator of the remote monitoring center remotely starting the second battery pack unloading program on the main display of the electric vehicle to controlling the second battery pack robot to start working; the second bracket installed at the lower end of the connecting rod is moving away from the second battery pack along with the connecting rod; a second loading platform on the second bracket gradually is separating from the second fixed platform of the second battery pack, and the second bracket is separating from the second battery pack to control the second battery pack robot to suspend working; the second battery pack is landing on the top of the battery pack tray of the ferry robot, and the ferry robot carrying the second battery pack along the rail to the first work station; the first palletizing robot grabbing the second battery pack from the top of the battery pack tray of the ferry robot at the work station to the seventh station;

step 6: the first palletizing robot grabbing the charged second battery pack and putting it on the top of the battery tray of the waiting ferry robot;

step 7: the ferry robot walking along the rail to the four column lifter and completing the X/Y direction, using the output difference between the output of the ultrasonic distance measuring sensor and the output of the encoder of the hydraulic mechanism as the input of the PID controller, controlling the PID of the proportional flow valve in the process of the robot's movement; when the hydraulic mechanism is lifting to the desired position, movement is suspending in the accurate position; the remote monitoring center sending the order of installing the second battery pack to the ferry robot, and the ferry robot holding the second battery pack to get to the installation position of the second battery pack under the chassis of the electric vehicle; the battery pack tray holding the second battery pack to the installation position of the second battery pack, and the operator of the remote monitoring center controlling the second battery pack robot system to start working; pushing the first battery pack to move so that the first fixing platform of the second battery pack gradually going into the second load-bearing platform of the battery support; connecting the second battery pack socket to the second plug closely, installing the second battery pack, controlling the second battery pack robot system to suspend working; the remote monitoring center sending the instruction of finishing installing the second battery pack to the ferry robot, and the ferry Robot leaving the four-column lifter along the track;

step 8: when the battery swapping process is over, the four-column lift is dropping, and the driver driving the electric vehicle away from the electric vehicle battery swapping station;

step 9: the remote monitoring center sending the signal of finishing battery swapping, completing the original reset of the electric vehicle battery swapping station.

\* \* \* \* \*